US008775083B2

(12) United States Patent
Young et al.

(10) Patent No.: US 8,775,083 B2
(45) Date of Patent: Jul. 8, 2014

(54) UTILITY MAPPING AND DATA DISTRIBUTION SYSTEM AND METHOD

(75) Inventors: Gary Neal Young, Oskaloosa, IA (US); Kevin L. Alft, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 13/620,471

(22) Filed: Sep. 14, 2012

(65) Prior Publication Data

US 2013/0030704 A1    Jan. 31, 2013

Related U.S. Application Data

(60) Continuation of application No. 13/089,857, filed on Apr. 19, 2011, now Pat. No. 8,280,634, which is a continuation of application No. 12/218,501, filed on Jul. 15, 2008, now Pat. No. 7,930,103, which is a continuation of application No. 11/296,844, filed on Dec. 7, 2005, now Pat. No. 7,400,976, which is a division of application No. 10/867,885, filed on Jun. 14, 2004, now Pat. No. 6,975,942, which is a division of application No. 09/881,656, filed on Jun. 14, 2001, now Pat. No. 6,751,553.

(60) Provisional application No. 60/211,431, filed on Jun. 14, 2000.

(51) Int. Cl.
*G01V 3/38*    (2006.01)
*G01S 3/02*    (2006.01)
*G01V 3/08*    (2006.01)

(52) U.S. Cl.
USPC .................. 702/5; 342/459; 324/326

(58) Field of Classification Search
USPC ................. 702/5, 1–2, 11, 14, 16, 33, 66–67, 702/70–73, 75–76, 81, 84, 127, 150, 168, 702/188–189; 367/36–38, 40–41, 47–49, 367/56, 68; 324/323, 326, 329, 348; 342/22, 459; 175/40–41, 45, 50
See application file for complete search history.

(56) References Cited

U.S. PATENT DOCUMENTS 3,288,242 A    11/1966   Loeb .............................. 367/37
4,297,699 A    10/1981   Fowler et al. .................. 342/22

(Continued)

FOREIGN PATENT DOCUMENTS

DE    9108986    12/1991
DE    9214241    1/1993

(Continued)

OTHER PUBLICATIONS

Aaltonen et al., "Geological Mapping Using GPR and Differential GPS Positioning: A Case Study", Proceedings of the Ninth International Conference on GPR, Apr. 29-May 2, 2002, Santa Barbara, California, pp. 207-210.

(Continued)

*Primary Examiner* — Toan Le
(74) *Attorney, Agent, or Firm* — Hillingsworth Davis, LLC

(57) ABSTRACT

A system and method of mapping underground utilities and other subsurface objects involves one or more of acquiring utility location data using a number of different detectors and sensors, processing the multiple detector/sensor output data to produce mapping data, storing the mapping data in a database, and providing access to and use of the stored mapping data by subscribing users on a usage fee basis.

21 Claims, 17 Drawing Sheets

(56) References Cited

U.S. PATENT DOCUMENTS

| | | |
|---|---|---|
| 4,430,653 A | 2/1984 | Coon et al. ............... 342/22 |
| 4,492,865 A | 1/1985 | Murphy et al. ........... 250/265 |
| 4,676,695 A | 6/1987 | Duthweiler ............... 405/157 |
| 4,686,475 A | 8/1987 | Kober et al. .............. 324/349 |
| 4,698,634 A | 10/1987 | Alongi et al. .............. 342/22 |
| 4,710,708 A | 12/1987 | Rorden et al. ......... 324/207.26 |
| 4,728,897 A | 3/1988 | Gunton .................. 324/329 |
| 4,806,869 A | 2/1989 | Chau et al. ............... 324/326 |
| 4,814,768 A | 3/1989 | Chang ...................... 342/22 |
| 4,843,597 A | 6/1989 | Gjessing et al. ........... 367/15 |
| 4,873,513 A | 10/1989 | Soults et al. ............... 345/27 |
| 4,896,116 A | 1/1990 | Nagashima et al. ...... 324/329 |
| 4,899,322 A | 2/1990 | Crutcher et al. ........... 367/59 |
| 4,905,008 A | 2/1990 | Kawano et al. ............ 342/22 |
| 4,912,643 A | 3/1990 | Beirxe ..................... 702/150 |
| 5,033,031 A | 7/1991 | Bohman .................... 367/96 |
| 5,065,098 A | 11/1991 | Salsman et al. .......... 324/326 |
| 5,092,657 A | 3/1992 | Bryan, Jr. ................. 299/1.1 |
| 5,103,920 A | 4/1992 | Patton ...................... 175/45 |
| 5,113,192 A | 5/1992 | Thomas ..................... 342/22 |
| 5,264,795 A | 11/1993 | Rider ....................... 324/326 |
| 5,274,557 A | 12/1993 | Moriya et al. .............. 701/50 |
| 5,321,613 A | 6/1994 | Porter et al. ................. 702/1 |
| 5,325,095 A | 6/1994 | Vadnais et al. ............. 342/22 |
| 5,337,002 A | 8/1994 | Mercer ...................... 324/326 |
| 5,339,080 A | 8/1994 | Steinway et al. ........... 342/22 |
| 5,341,886 A | 8/1994 | Patton ......................... 175/24 |
| 5,365,442 A | 11/1994 | Schmidt ..................... 701/50 |
| 5,370,478 A | 12/1994 | Bartlett et al. ........... 405/129.6 |
| 5,375,663 A | 12/1994 | Teach ......................... 172/4.5 |
| 5,384,715 A | 1/1995 | Lytton ......................... 702/12 |
| 5,410,252 A | 4/1995 | Potter et al. ................ 324/345 |
| 5,412,623 A | 5/1995 | Asada et al. ................ 367/190 |
| 5,446,981 A | 9/1995 | Kamada et al. .............. 37/348 |
| 5,469,155 A | 11/1995 | Archambeault et al. ... 340/853.4 |
| 5,471,771 A | 12/1995 | Gilbert ......................... 37/348 |
| 5,499,029 A | 3/1996 | Bashforth et al. ........... 342/22 |
| 5,509,220 A | 4/1996 | Cooper ........................ 37/348 |
| 5,528,518 A | 6/1996 | Bradshaw et al. .......... 702/150 |
| 5,544,052 A | 8/1996 | Fujita et al. .................. 702/5 |
| 5,546,572 A | 8/1996 | Seto et al. ....................... 1/1 |
| 5,553,407 A | 9/1996 | Stump ......................... 37/348 |
| 5,585,726 A | 12/1996 | Chau ......................... 324/326 |
| 5,607,205 A | 3/1997 | Burdick et al. ............... 299/1.5 |
| 5,614,670 A | 3/1997 | Nazarian et al. ............ 73/146 |
| 5,631,970 A | 5/1997 | Hsu ........................... 382/113 |
| 5,633,589 A | 5/1997 | Mercer ...................... 324/326 |
| 5,644,237 A | 7/1997 | Eslambolchi et al. ...... 324/326 |
| 5,659,985 A | 8/1997 | Stump ......................... 37/348 |
| 5,673,050 A | 9/1997 | Moussally et al. ........... 342/22 |
| 5,682,136 A | 10/1997 | Del Signore ............... 340/436 |
| 5,698,981 A | 12/1997 | Mercer ....................... 324/329 |
| 5,704,142 A | 1/1998 | Stump ......................... 37/348 |
| 5,711,381 A | 1/1998 | Archambeault et al. ..... 175/45 |
| 5,720,354 A | 2/1998 | Stump et al. ................. 175/26 |
| 5,746,278 A | 5/1998 | Bischel ........................ 175/24 |
| 5,757,320 A | 5/1998 | McEwan ..................... 342/387 |
| 5,764,062 A | 6/1998 | Mercer ........................ 324/329 |
| 5,767,678 A | 6/1998 | Mercer ........................ 324/326 |
| 5,769,503 A | 6/1998 | Stolarczyk et al. .......... 299/1.2 |
| 5,774,091 A | 6/1998 | McEwan ...................... 342/387 |
| 5,786,537 A | 7/1998 | Anstey .......................... 73/662 |
| 5,805,110 A | 9/1998 | McEwan ...................... 342/387 |
| 5,819,859 A | 10/1998 | Stump et al. .................. 175/26 |
| 5,825,660 A | 10/1998 | Cagan et al. ................... 703/2 |
| 5,844,564 A | 12/1998 | Bennis et al. ................ 345/423 |
| 5,867,117 A | 2/1999 | Gogineni et al. .............. 342/22 |
| 5,904,210 A * | 5/1999 | Stump et al. .................. 175/45 |
| 5,933,014 A | 8/1999 | Hartrumpf et al. ........... 324/642 |
| 6,014,343 A | 1/2000 | Graf et al. ..................... 367/38 |
| 6,035,951 A | 3/2000 | Mercer et al. ................. 175/45 |
| 6,078,869 A | 6/2000 | Gunasekera .................... 702/6 |
| 6,088,294 A | 7/2000 | Leggett, III et al. ......... 367/25 |
| 6,106,561 A | 8/2000 | Farmer ........................ 703/10 |
| 6,119,804 A | 9/2000 | Owen .......................... 181/113 |
| 6,151,555 A | 11/2000 | Van Bemmel et al. ......... 702/14 |
| 6,195,922 B1 | 3/2001 | Stump ............................ 37/348 |
| 6,225,941 B1 | 5/2001 | Gogineni et al. .............. 342/22 |
| 6,252,538 B1 | 6/2001 | Chignell ........................ 342/22 |
| 6,302,221 B1 | 10/2001 | Hamman et al. ............. 175/50 |
| 6,307,573 B1 | 10/2001 | Barros ........................ 715/764 |
| 6,308,787 B1 | 10/2001 | Alft ............................. 175/48 |
| 6,313,755 B1 | 11/2001 | Hetmaniak et al. ........ 340/856.3 |
| 6,315,062 B1 | 11/2001 | Alft et al. ..................... 175/45 |
| 6,327,533 B1 | 12/2001 | Chou .......................... 701/500 |
| 6,363,320 B1 | 3/2002 | Chou .......................... 701/446 |
| 6,373,486 B1 | 4/2002 | Simpson ..................... 345/423 |
| 6,377,201 B1 | 4/2002 | Chu ............................. 342/22 |
| 6,377,210 B1 | 4/2002 | Moore ....................... 342/357.4 |
| 6,389,360 B1 | 5/2002 | Alft et al. ....................... 702/9 |
| 6,435,286 B1 | 8/2002 | Stump et al. ................. 175/26 |
| 6,437,726 B1 | 8/2002 | Price ............................ 342/22 |
| 6,462,696 B1 | 10/2002 | Gorman ....................... 342/22 |
| 6,477,795 B1 | 11/2002 | Stump ......................... 424/411 |
| 6,484,818 B2 | 11/2002 | Alft et al. ..................... 175/45 |
| 6,501,413 B2 | 12/2002 | Annan et al. ................. 342/22 |
| 6,532,190 B2 | 3/2003 | Bachrach ..................... 367/25 |
| 6,667,709 B1 | 12/2003 | Hansen et al. ................ 342/22 |
| 6,700,526 B2 | 3/2004 | Witten .......................... 342/22 |
| 6,701,647 B2 | 3/2004 | Stump ......................... 37/348 |
| 6,719,069 B2 | 4/2004 | Alft et al. ..................... 175/24 |
| 6,739,165 B1 | 5/2004 | Strack .......................... 702/13 |
| 6,751,553 B2 | 6/2004 | Young et al. .................... 702/5 |
| 6,755,263 B2 | 6/2004 | Alft et al. ...................... 175/61 |
| 6,766,253 B2 | 7/2004 | Burns et al. .................... 702/6 |
| 6,833,795 B1 | 12/2004 | Johnson et al. ............ 340/853.5 |
| 6,886,644 B2 | 5/2005 | Stump et al. ................. 175/61 |
| 6,915,211 B2 | 7/2005 | Kram et al. ..................... 702/5 |
| 6,975,942 B2 * | 12/2005 | Young et al. .................... 702/5 |
| 6,980,482 B2 | 12/2005 | Faichney et al. ............. 367/73 |
| 7,013,991 B2 | 3/2006 | Wilson-Langman et al. .. 175/48 |
| 7,034,740 B2 | 4/2006 | Witten .......................... 342/22 |
| 7,065,446 B2 | 6/2006 | Chou .......................... 701/472 |
| 7,072,668 B2 | 7/2006 | Chou ........................ 455/456.1 |
| 7,085,196 B2 | 8/2006 | Nemeth ........................ 367/76 |
| 7,113,124 B2 | 9/2006 | Waite ........................... 342/22 |
| 7,123,016 B2 | 10/2006 | Larsen ......................... 324/326 |
| 7,143,844 B2 | 12/2006 | Alft et al. ..................... 175/45 |
| 7,182,151 B2 | 2/2007 | Stump et al. ................. 175/61 |
| 7,184,611 B2 | 2/2007 | Miyagi et al. ................ 382/291 |
| 7,202,801 B2 | 4/2007 | Chou ........................... 340/994 |
| 7,218,244 B2 | 5/2007 | Jin et al. ..................... 340/853.3 |
| 7,400,976 B2 * | 7/2008 | Young et al. .................... 702/5 |
| 7,424,133 B2 | 9/2008 | Schultz et al. ............... 382/106 |
| 7,612,704 B2 | 11/2009 | Ryerson et al. ............... 342/22 |
| 7,676,534 B2 | 3/2010 | Murakami et al. ........... 708/442 |
| 7,930,103 B2 * | 4/2011 | Young et al. .................... 702/5 |
| 8,280,634 B2 * | 10/2012 | Young et al. .................... 702/5 |
| 2002/0130806 A1 | 9/2002 | Taylor et al. .................. 342/22 |
| 2003/0012411 A1 | 1/2003 | Sjostrom et al. ............ 382/109 |
| 2004/0168358 A1 | 9/2004 | Stump ......................... 37/348 |
| 2008/0079723 A1 | 4/2008 | Hanson et al. .............. 345/427 |

FOREIGN PATENT DOCUMENTS

| | | |
|---|---|---|
| DE | 19509934 | 10/1995 |
| DE | 19845330 | 4/2000 |
| DE | 10018031 | 10/2001 |
| EP | 0269283 | 6/1988 |
| EP | 0289623 | 9/1993 |
| FR | 2673002 | 8/1992 |
| JP | 03187423 | 8/1991 |
| JP | 6230141 | 8/1994 |
| NL | 9002065 | 4/1992 |

OTHER PUBLICATIONS

Akita et al., "Practical Usage and Future Prospects of a Mapping System Using a Pen-Based Computer", Proceedings AM/FM International Annual Conference, Mar. 20, 1995, pp. 699-707.

Alippi et al., "Hardware Requirements for Digital VLSI Implementation of Neural Networks", IEEE International Joint Conference on Neural Networks, vol. 3, 1991, pp. 1873-1878 (Abstract only).

(56) References Cited

OTHER PUBLICATIONS

AWPA—"Uniform Color Code", Mar. 6, 2001—http://web.archive.org/web/20010306004125/http://www.callbeforeyoudig.org/color.htm.
Baker et al., "Source-Dependent Frequency Content of Ultrashallow Seismic Reflection Data", Bulletin of the Seismological Society of America, 90, 2, p. 494-499, Apr. 2000.
Bakhtar et al., "Testing and UXO Detection Using US Air Force EarthRadar System," Mar. 1996.
Bernold et al., "A Multi-Sensory Approach to 3-D Mapping of Underground Utilities", 19th Proceedings of International Symp. on Automation & Robotics in Construction, Sep. 23-25, 2002.
"Ditch Witch Subsite Trac Management System Plus", http://www.ditchwitch.com/produtct/productview/138 Accessed Aug. 13, 2002.
1995, Dobecki et al. "Geotechnical and Groundwater Geophysics." Geophysics, vol. 50, No. 12, Dec. 1985, p. 2621-2636 (abstract only).
Oct. 10, 2001, "Drill Path," Infrasoft, LLC., Computer Software for Solving Infrastructure Problems, 2916 West T.C. Jester, Houston, Texas 77018, 20 pages.
Dussauge-Peisser et al., Investigation of a fractured limestone cliff (Chartreuse Massif, France) using seismic tomography and ground-penetrating radar Near Surface Geophysics, 1, 161-170, Aug. 2003.
Figdor et al. "Geophysical reconnaissance of covered waste disposal grounds." OEIAZ Austrian Engineer and Architects' Magazine, vol. 134, No. 9, Austria, Sep. 1989. pp. 450-456.
Frohlich et al., "Exploring geo-scientific data in virtual environments", Proceedings of the Conference on Visualization 1999: Celebrating Ten Years, IEEE Visualization, IEEE Computer Society Press, Los Alamitos, CA, pp. 169-173, Oct. 1999.
Guenther et al., Proceedings of the Fifth International Conference on Ground Penetrating Radar, The Geophysical Investigation of Drilling Obstacles for Microtunnelling Projects by Means of GPR, vol. 3 of 3, Jun. 1994, pp. 1151-1165. (Abstract only).
Haizhong et al., Derivative Seismic Processing Method for GPR Data, 1997 IEEE, pp. 145-147. (Abstract only).
Herman, "Robotic Subsurface Mapping Using Ground Penetrating Radar", PhD thesis, Carnegie Mellon University, May 1997, 143 pages.
Hodgson, "Computerized Well Planning for Directional Wells", SPE, No. 12071, Oct. 8, 1983, pp. 1-6 (abstract only).
Hussain et al., Application of Migration to Ground Probing Radars, 1988 IEEE, pp. 1208-1211. (Abstract only).
Kathage, Proceedings of the Fourth International Conference on Ground Penetrating Radar, Geological Survey of Finland, A Challenge: GPR in Advance of Horizontal Drilling, Special Paper 16, Jun. 1992, pp. 119-124. (Abstract only).
Liu, "Using GPR and seismic reflection measurements to characterize buried objects: large-scale simulation." IGARSS '97. 1997 In'tl Geoscience and Remote Sensing Symposium. pp. 1147-1149, vol. 3.
Liu et al. "Identification of paleo-liquefaction and deformation features with GPR in the New Madrid seismic zone." The 8th Int'l Conference of Ground Penetrating Radar. Goldcoast, May 23-26, 2000. vol. 4084, pp. 383-389 (abstract only).
McFee et al., "Multisensor vehicle-mounted teleoperated mine detector with data fusion", Proc. SPIE, vol. 3392, 1082, 1998, abstract only.
Parker, "Buried Facility Locating with GPS Interface," GBIS '99, Edmonton, Dec. 1999.
Powers et al., "Integrated Use of Continuous Seismic-Reflection Profiling and Ground-Penetrating Radar Methods at John's Pond, Cape Cod, Massachusetts", 12th Proceeding on Applications of Geophysics to Eng. & Environment, 1999 (abstract only).
Santos, "The Development and Field Application of a 3D Computer Graphics System for Displaying Wellbore Trajectories", SPE, No. 29197, Nov. 10, 1994, pp. 371-382.
Schwamborn et al. "Ground penetrating radar and shallow seismic-stratigraphic and permafrost investigations of Lake Nikolay, Delta Lena and Arctic Siberia." The 8th Int'l Conference of Ground Penetrating Radar. Goldcoast, May 23-26, 2000. vol. 4084, 2000, pp. 783-789 (abstract only).
Shoemaker et al., "Reflection Seismic and Ground Penetrating Radar Study of Previously Mined (Lead/Zinc) Ground", Joplin, Missouri, Missouri Department of Transportation special publication, 2000, 15 pages.
Van der Veen et al., "Design and application of a towed land-streamer system for cost-effective 2-D and pseudo-3-D shallow seismic data acquisition", Geophysics, vol. 66, No. 2, (Mar.-Apr. 2001), p. 482-500.
Well et al. Investigations of Hazardous Waste Sites Using Thermal IR and Ground Penetrating Radar, Photogrammetric Engineering & Remote Sensing, vol. 60, No. 8, Aug. 1994, pp. 999-1005. (Abstract only).
White, "Building an Urban Image." Archeologia e Calcolatori (International Association of Computing in Archaeology, Rome Italy), vol. 7, 1996, 137-147 (abstract only).
Yasunaga et al., "Design, Fabrication and Evaluation of a 5-inch Wafer Scale Neural Network LSI Composed of 576 Neurons", IEEE International Joint Conference on Neural Networks, vol. II, 1990, pp. 527-535.
Yoder et al., "Mapping agricultural fields with GPR and EMI to predict offsite movement of agrochemicals", Proc. SPIE, vol. 4084, 20, 2000, abstract only.
Jul. 9, 2013, File History for U.S. Appl. No. 12/218,501.
Jul. 9, 2013, File History for U.S. Appl. No. 11/296,844.
Jul. 9, 2013, File History for U.S. Appl. No. 10/867,885.
File History for EP Application No. 01987887.5 as retrieved from the European Patent Office Electronic File System on Jul. 9, 2013, 297 pages.
Jul. 9, 2013, File History for U.S. Appl. No. 09/881,656.
Jul. 9, 2013, File History for U.S. Appl. No. 13/089,857.
International Preliminary Examination Report dated Apr. 7, 2003 for PCT Application No. PCT/US01/40996, 10 pages.

* cited by examiner

UTILITY MAPPING AND DATA DISTRIBUTION SYSTEM AND METHOD

RELATED APPLICATIONS

This application claims priority to provisional application U.S. Ser. No. 60/211,431, filed on Jun. 14, 2000, and is a continuation of U.S. application Ser. No. 13/089,857, filed Apr. 19, 2011. U.S. Pat. No. 8,280,634, which is a continuation of U.S. Ser. No. 12/218,501, filed on Jul. 15, 2008, now U.S. Pat. No. 7,930,103, which is a continuation of U.S. Ser. No. 11/296,844, filed on Dec. 7, 2005, now U.S. Pat. No. 7,400,976, which is a divisional of U.S. Ser. No. 10/867,885, filed Jun. 14, 2004, now U.S. Pat. No. 6,975,942, which is a divisional of U.S. Ser. No. 09/881,656, filed on Jun. 14, 2001, now U.S. Pat. No. 6,751,553, which are hereby incorporated by reference in their respective entireties.

FIELD OF THE DISCLOSURE

The present invention relates generally to the field of underground utility and object detection, and, more particularly, to one or more of detecting buried utility and subsurface objects, mapping such utilities and objects, and electronically distributing mapping data to subscribing users.

BACKGROUND

Various techniques have been developed to locate and map underground utilities and other manmade subsurface structures. Present utility mapping practices take two basic forms: active systems that must have some type of connection to the utility at some accessible point along its path, and passive systems that attempt to map utilities independent of any connection or even prior knowledge of their existence.

Active systems are problematic for various reasons, such as the difficulty and cost of physically accessing the utility and difficulty in sensing non-conductive utilities. Passive systems currently in use often employ GPR. GPR surveys are conducted from the surface, and the location and relative depth to potential utilities are determined from an analysis of reflected energy.

GPR, in general, is a very good sensor for utility mapping purposes, in that GPR is easy to use and provides excellent resolution. However, GPR has problems detecting utilities in certain soil types and conditions that limit GPR's use in many areas of the United States and the world, such as much of southwest United States (e.g., Arizona). Improvements in GPR sensor design can help overcome some aspects of these inherent limitations, but in many geographic areas, GPR should not be solely relied on due to imaging reliability and accuracy concerns.

Before trenching, boring, or otherwise engaging in invasive subsurface activity to install or access utilities, it is imperative to know the location of any existing utilities and/or obstructions in order to assist in trenching or boring operations and minimize safety risks. Currently, utilities that are installed or otherwise discovered during installation may have their corresponding physical locations manually recorded in order to facilitate future installations. One such system is referred to as the One-Call system, where an inquiry call can be made to obtain utility location information from an organization that manually records utility location information, when and if it is provided. However, the One-Call system is not particularly reliable, as only a certain percentage of the utilities are recorded, and those that are recorded may have suspect or imprecise location data. As such, currently-existing location data for buried utilities is incomplete and often questionable in terms of reliability.

There is a need in the utility installation and locating industries to increase the accuracy of buried utility/object detection. There exists a further need to collect, maintain, and disseminate utility location data of increased accuracy. The present invention fulfills these and other needs, and provides additional advantages over the prior art.

SUMMARY

The present invention is directed to improved systems and methods of detecting underground utilities and other subsurface objects. The present invention is also directed to systems and methods of mapping underground utilities. Embodiments of the present invention are also directed to systems and methods of acquiring and storing mapping data in a database. Embodiments of the present invention are further directed to systems and methods of providing access to and use of stored mapping data by subscribing users. These and other features disclosed and claimed herein may be employed individually or in various combinations in accordance with the principles of the present invention.

In one embodiment, a method of detecting one or more underground utilities involves concurrently sensing a number of physical parameters of a subsurface, storing data associated with the sensed physical parameters, and detecting the utilities within the subsurface using the stored data. Detecting the utilities may involve associating stored data for each of the sensed physical parameters in terms of depth and position.

Detecting the utilities may also involve combining the stored data to produce combined data, and detecting the utilities within the subsurface using the combined data. The stored data may be combined to produce combined data expressed in terms of subsurface depth. The stored data may also be combined to produce combined data expressed in terms of horizontal path length. Also, the stored data may be combined based on soil characteristics to produce combined data. The utilities within the subsurface can be detected using one or more of these combined data types.

Detecting one or more underground utilities may also involve determining one or more soil characteristics using one or more of the sensed physical parameters. For example, one or more of soil resistivity, conductivity, permittivity, temperature, water saturation, composition, and hardness may be determined using one or more of the sensed physical parameters.

Detecting underground utilities may involve weighting the stored data based on signal noise associated with the sensed physical parameters, The utilities within the subsurface can be detected using the weighted stored data. Detecting the utilities may further involve fusing the stored data to produce fused data. The utilities within the subsurface can be detected using the fused data.

Tolerance factor data associated with the stored data may further be computed. The tolerance factor data may be computed dynamically or subsequent to storing the data. Weighting the stored data may be accomplished using the tolerance factor data. Tolerance factor data may be computed for each data point of the stored data. Tolerance factor data may also be computed for each of the detected utilities in toto. Ground truth data may be processed to enhance the accuracy of the utility detection result.

Detecting underground utilities may further involve generating a map of the detected utilities. Data associated with the map may be incorporated within a Geographic Information System or other geographic reference system. A 2-D map or a 3-D map of the detected utilities can be generated. Data associated with one or more of the sensed physical parameters or one or more of the detected utilities may be displayed, such as by use of an operator interface.

According to another embodiment of the present invention, detecting one or more underground utilities involves generating radar waves and seismic waves of about the same wavelength. A number of physical parameters of a subsurface are concurrently sensed using the radar waves and seismic waves. Data associated with the sensed physical parameters are stored, and the utilities within the subsurface are detected using the stored data.

The seismic waves, in one embodiment, comprise seismic shear waves. In one embodiment, the seismic shear waves have frequencies of less than 1,000 Hz. In another embodiment, the seismic shear waves have frequencies in excess of 1,000 Hz. For example, the seismic shear waves may have frequencies in the range of about 2,000 Hz to about 3,200 Hz. In another approach, the seismic shear waves may have frequencies of at least about 3 kHz.

The radar waves and seismic waves typically have wavelengths for detecting underground utilities of a predefined size. By way of non-limiting example, the radar waves and seismic waves may have wavelengths for detecting underground utilities having a dimension of at least ⅜-inch. The radar waves and seismic waves may, for example, have wavelengths of about 3 inches. In general, the radar waves and seismic waves preferably have wavelengths that can facilitate detection of underground utilities at depths of up to about 50 feet, preferably by use of both wave types, but at least by use of one of the waves types for deeper target utilities. For example, the radar waves and seismic waves may have wavelengths of less than about 0.5 feet for conducting near surface (e.g., 15-30 feet or less) underground utility detection. It is understood that the principles of the present invention may be applied for detection of utilities at depths in excess of 50 feet depending on the detection capabilities of the detectors employed. The detection methodology may further involve determining velocities of the radar waves and seismic waves, respectively.

In accordance with a further embodiment of the present invention, detecting one or more underground utilities involves concurrently sensing a number of physical parameters of a subsurface, storing data associated with the sensed physical parameters, and mapping the utilities within the subsurface as a function of subsurface depth using the stored data. The utilities are typically mapped within the subsurface as a function of position and subsurface depth.

Mapping the utilities typically involves computing depth of the utilities as a function of position. Mapping the utilities may further involve computing a depth tolerance factor associated with at least some of the sensed physical parameters. The depth tolerance factors are typically computed as a function of position. Tolerance factor data may be computed for each data point of the stored data. Tolerance factor data may also be computed for each of the utilities in toto. Ground truth data may be used to enhance the accuracy of utility mapping.

A 2-D map or a 3-D map of the utilities may be generated. Mapping data may be incorporated within a Geographic Information System or other positional reference system. The Geographic Information System, for example, preferably defines subsurface mapping data in three dimensions using subsurface depth data. Data associated with one or more of the sensed physical parameters, one or more of the detected utilities, or a map of the detected utilities may be displayed.

In accordance with yet another embodiment of the present invention, an apparatus for detecting underground utilities includes a sensor system comprising a number of sensors. Each of the sensors senses a physical parameter of the subsurface differing from that sensed by other sensors of the sensor system, it being understood that redundant sensors sensing the same physical parameter or parameters may be employed.

A memory stores sensor data acquired by the sensors. A processor is coupled to the sensor unit and memory. The processor controls contemporaneous acquisition of the sensor data from the sensors and detects underground utilities within the subsurface using the sensor data. The apparatus may further include a positional reference system. The positional reference system produces position data associated with a position of each of the sensors.

In one system deployment, the system includes a radar unit that generates radar waves and a seismic unit that generates seismic waves. Preferably, the radar and seismic waves have about the same wavelength, as discussed above. The seismic unit preferably generates seismic shear waves.

The sensor system may include two or more of a ground penetrating radar (GPR) sensor, a seismic sensor, a nuclear magnetic resonance (NMR) sensor, an electromagnetic (EM) sensor, a time-domain electromagnetic (TDEM) sensor, and cone penetrometer instrument. The sensor system may also include one or more of a resistivity sensor, a permittivity sensor, a conductivity sensor, and a magnetometer. One or both of an infrared sensor and a video device may further be included.

The processor, in one embodiment, is coupled to a data fusion engine for processing the contemporaneously acquired sensor data. The processor performs joint inversion of the sensor data to determine a depth and a location of the detected utilities. The processor computes tolerance factor data associated with sensor data stored in memory. The processor weights the stored data using the tolerance factor data. Tolerance factor data may be computed for each of the detected utilities. The memory may store ground truth data and the processor may process the ground truth data to enhance accuracy of utility detection.

A processor, which may be a processor different from that coupled to the sensor unit, generates a map of the detected utilities using the sensor data. Data associated with the map may be incorporated within a Geographic Information System or other geographic reference model. The processor may generate a 2-D map or a 3-D map of the detected utilities. A display is coupled to the processor. The processor causes the display to display data associated with one or more of the sensed physical parameters or one or more of the detected utilities.

According to another embodiment, a utility mapping database system stores, manages, and disseminates utility detection and mapping data. Detector data acquired and processed during a mapping operation is preferably stored in a utility location database. It is understood that data stored and processed within the utility mapping database according to this embodiment may be developed by multiple utility detectors, as discussed above, or a single utility detector, such as a GPR or seismic sensor. As such, the features and advantages realized by implementation and use of a utility mapping database system according to this embodiment of the present invention do not require that the utility data be obtained using a multiplicity of utility detectors.

The utility location database may be a single or distributed database. The utility location database preferably stores mapping data for numerous areas or regions within cities, countries, and continents. The mapping data for given locations may vary in terms of confidence level (e.g., accuracy or reliability), with lower confidence level mapping data being replaced with higher confidence level mapping data over time.

A mapping data distribution system provides user access to mapping data and ancillary resources which may be accessed via public and private interfaces. In one embodiment, internet/web access to the mapping data distribution system provides for world-wide access to the system's mapping data and resources. Accounting and billing mechanisms provide a means for charging users for accessing and utilizing data and resources of the mapping data distribution system.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
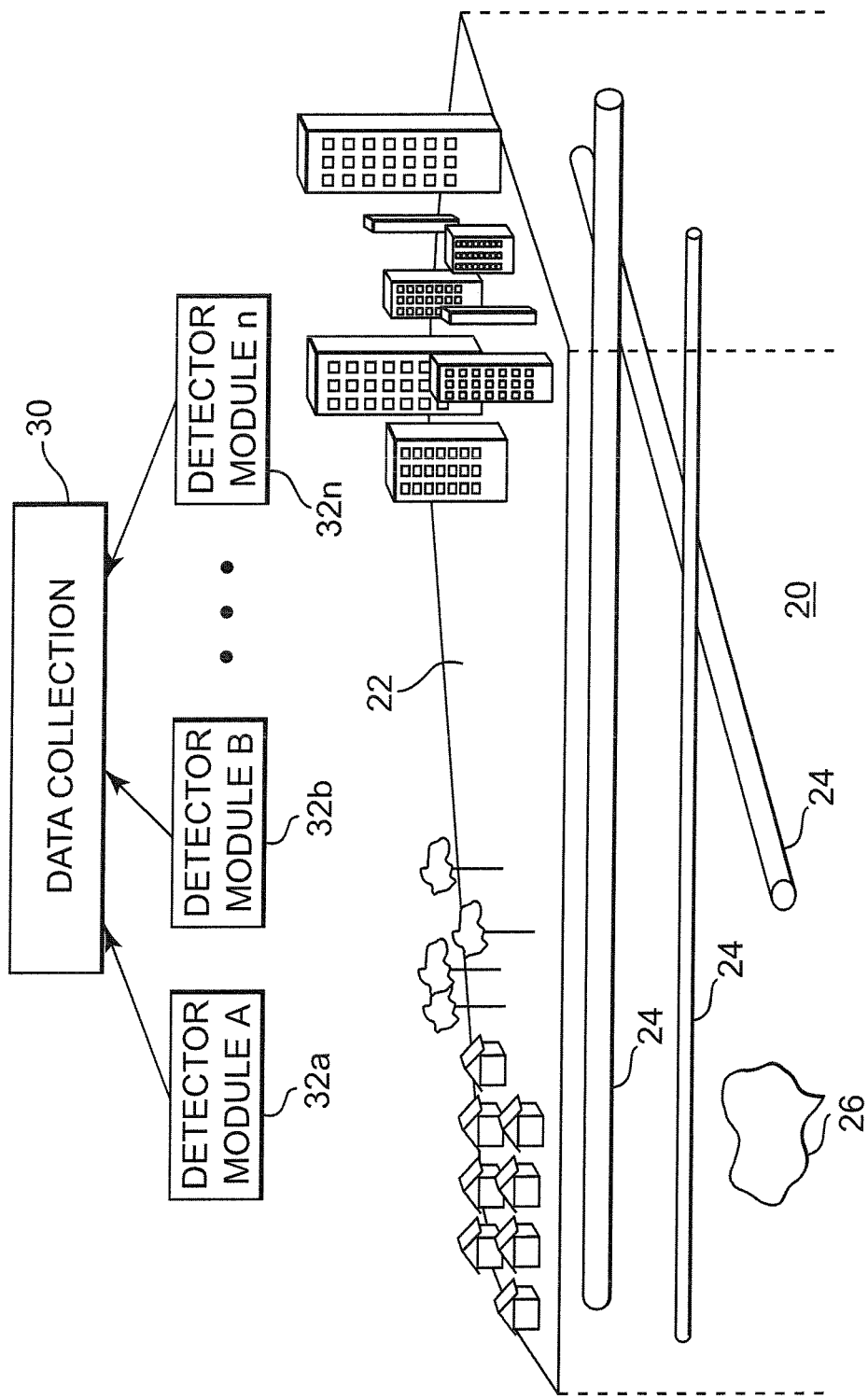
FIG. 1 is a cross-sectional view of a geographic area representing an urban subsurface within which various utilities are installed, the utilities being detected and mapped in accordance with the principles of the present invention.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

According to an embodiment of the present invention, location data for an existing or new installation site is acquired using at least one, and generally several, utility detectors. One or more of the utility detectors may be of type that generates a probe signal, transmits the probe signal into the subsurface of interest, and detects a response signal from the subsurface. The response signal may be a naturally occurring reflection signal or a signal produced by a device situated within the subsurface, such as by a device mounted to an existing or newly installed utility. One or more of the utility detectors may be of type that only receives signal information or other data from an external source, such as from a source on or in proximity with a buried utility.

For example, an above-ground or downhole GPR or seismic/acoustic utility detectors may be used to perform subsurface imaging for purposes of detecting buried utilities and obstacles. Various techniques for detecting subsurface structures and objects and for characterizing subsurface geology are disclosed in commonly assigned U.S. Pat. Nos. 5,720,354, 5,904,210, 5,819,859, 5,553,407, 5,704,142, and 5,659,985, all of which are hereby incorporated herein by reference in their respective entireties. An exemplary approach for detecting an underground object and determining the range of the underground object using radar signals is described in U.S. Pat. Nos. 5,867,117 and 6,225,941, which are hereby incorporated herein by reference in their respective entireties.

Utility detectors of differing or similar technologies and configurations may be situated above ground, at ground level, within the subsurface, on or within a buried utility, or within or on an underground boring or reaming apparatus. Utility detectors of different or common types may be situated on separate movable platforms or on a common movable platform.

In a typical system deployment, a number of different utility detectors are used to scan a given volume of earth that contains one or more utilities. The data acquired by the multiplicity of utility detectors is associated with position reference data as the detectors are displaced during the scanning operation. The signals acquired from the multiplicity of utility detectors are preferably, but not necessarily, processed by a data fusion engine to produce utility location data. The data fusion engine may also produce quality data which indicates the relative quality or reliability of the utility location data (e.g., tolerance data). The quality data typically varies as a function of 3-D location of the utility within the volume of earth subject to the mapping/scanning operation.

The detector data acquired and processed during the mapping operation is preferably stored in a utility location database. The utility location database may be a single or distributed database. The utility location database preferably stores mapping data for numerous areas or regions within cities, countries, and continents (e.g., global mapping database system). The mapping data for given locations may vary in terms of confidence level (e.g., accuracy or reliability), with lower confidence level mapping data being replaced with higher confidence level mapping data over time.

A mapping data distribution system provides user access to mapping data and ancillary resources which may be accessed via public and private interfaces. In one embodiment, internet/web access to the mapping data distribution system provides for world-wide access to the system's mapping data and resources. Accounting and billing mechanisms provide a means for charging users for accessing and utilizing data and resources of the mapping data distribution system.

According to one embodiment, a utility detection system of the present invention is provided on a portable platform(s) and towed by a small vehicle, such as an all terrain vehicle (ATV). In this system deployment, utility detection data is preferably acquired at collection speeds between about 2 and 5 mph for depths of at least 15 feet or more. The accuracy of individual utility detectors varies as a function detector technology, speed of scanning along scan path, depth, and soil conditions, among other factors. It is preferred that the detection data be accurate to no less than 6 inches vertical when monitoring utilities 8 feet or less below the surface being traveled. The mobile utility detection system operates over flat and sloped terrain, and operates nominally at any angle up to at least 15 degrees from horizontal in both fore-aft and side-to-side positions.

FIG. 1 is a cross-sectional view of a geographic area representing the subsurface 20 of a section of the earth. In this particular example, the illustrated geographic area includes urban and residential developments at the surface 22. Utilities and services 24 (generally referred to herein as "utilities") are often provided to these developments by way of buried conduits, cables, etc. These utilities 24 include products and services such as gas, water, sewer, electrical lines, telephone wires, cable, fiber optic cable, data lines, and other utilities/services. The buried utilities 24 generally illustrated in FIG. 1 may be provided via utility conduits (e.g., sewer or water conduits, electrical conduits, etc.), or may be directly installed in the ground (e.g., cables or other utilities laid without conduits).

There are several manners in which such utilities 24 are installed below the earth's surface, including digging trenches with trenching machines or backhoes, and drilling subsurface bores (trenchless drilling) using a boring machine. When installing new utilities and services 24, it is problematic to encounter existing utilities 24 or other obstructions that lie in the path where the utility is to be installed. Obstructions 26, such as rock or other material that is difficult to penetrate, can cause great difficulty when digging, trenching or boring. Notwithstanding the potential damage to existing subsurface utilities 24, such an encounter may pose substantial safety concerns when a trenching or boring apparatus encounters an existing utility, such as a gas line.

Before trenching, boring, or engaging in other invasive subsurface activity, it is thus imperative to know the location of the existing utilities 24 and/or obstructions 26, in order to assist in trenching or boring operations and minimize safety risks. Currently, utilities 24 that are installed or otherwise discovered during installation may have their corresponding physical locations manually recorded in order to facilitate future installations. One such system, as was discussed previously, is referred to as the One-Call system, where an inquiry call can be made to obtain utility location information from an organization that manually records utility location information, when and if it is provided. However, the One-Call system is not particularly reliable, as only a certain percentage of the utilities 24 are recorded, and those that are recorded may have suspect or imprecise location data. Therefore, currently-existing location data for buried utilities 24 is incomplete and often questionable in terms of reliability.

New underground utilities 24 are being installed every day. As cities expand or undergo reconstruction, additional water, sewer, gas, electric, cable television, telephone, fiber optic, and other underground utilities 24 are buried, causing and ever-increasing challenge to new utility installations. An embodiment of the present invention provides a manner of accurately mapping existing and new utilities 24, obstructions 26, soil characteristics, and other information pertaining to the subsurface in which digging, trenching and/or boring may occur.

In accordance with an embodiment of the present invention, multiple detection mechanisms are utilized in concert to provide accurate placement information pertaining to underground utilities 24 and associated ground attributes. For example, multiple detectors 32, such as detector module 32a, detector module 32b, through detector module 32n in FIG. 1, can each perform detection functions in order to locate the underground utilities 24 or other objects of interest. These functions may be performed sequentially, concurrently, or in some combination thereof, such that the desired one or more detectors 32 identify the physical location of these underground structures in the best possible manner using the corresponding detection technologies.

As will be described in further detail below, probe signals may be transmitted into the ground, generating return signals that can be detected by the detector modules 32 in response to reflection or otherwise responsive signals from the buried utilities 24 or other structures. In alternative embodiments, signals originating underground may be detected by the detector modules 32. For example, signals associated with the placement of particular utilities 24 may be generated for detection by the detector modules 32, or sensors may be permanently located under the ground at strategic locations from which probe signals and corresponding detection occurs. Some detection mechanisms detect characteristics of the soil and/or utilities 24 without the need for an explicitly generated signal, such as the detection of magnetic fields, heat, etc. Further, signals generated within or received by the borehead in a trenchless drilling system may be used to provide location information of the borehead, and borehead sensing technology may be utilized where sensors in the borehead provide information as to the location of existing underground utilities 24 and other objects.

In accordance with another embodiment of the present invention, buried structure location information is collected as illustrated by the data collection module 30 shown in FIG. 1. Location data pertaining to existing or "as-built" utilities 24 ascertained by any utility location device, or by manual measurements, are collected in the data collection module 30 to create a database of the subsurface structures. The data stored in the utility location database 38 essentially provides a map of new and pre-existing underground structures of interest. Such a database can be continuously updated so that it contains the most recent map of the subsurface structures. When further invasive subsurface activity occurs, the database can be called upon to provide subsurface structure information to assist in the invasive subsurface activity with greatly diminished concerns that existing subsurface structures will be inadvertently encountered as a result of the invasive activity. As will be described in greater detail below, such a database can be commonly collected in a single database via various transmission means, or alternatively, may comprise a distributed database of a plurality of discrete or regional databases.

Figure 2:
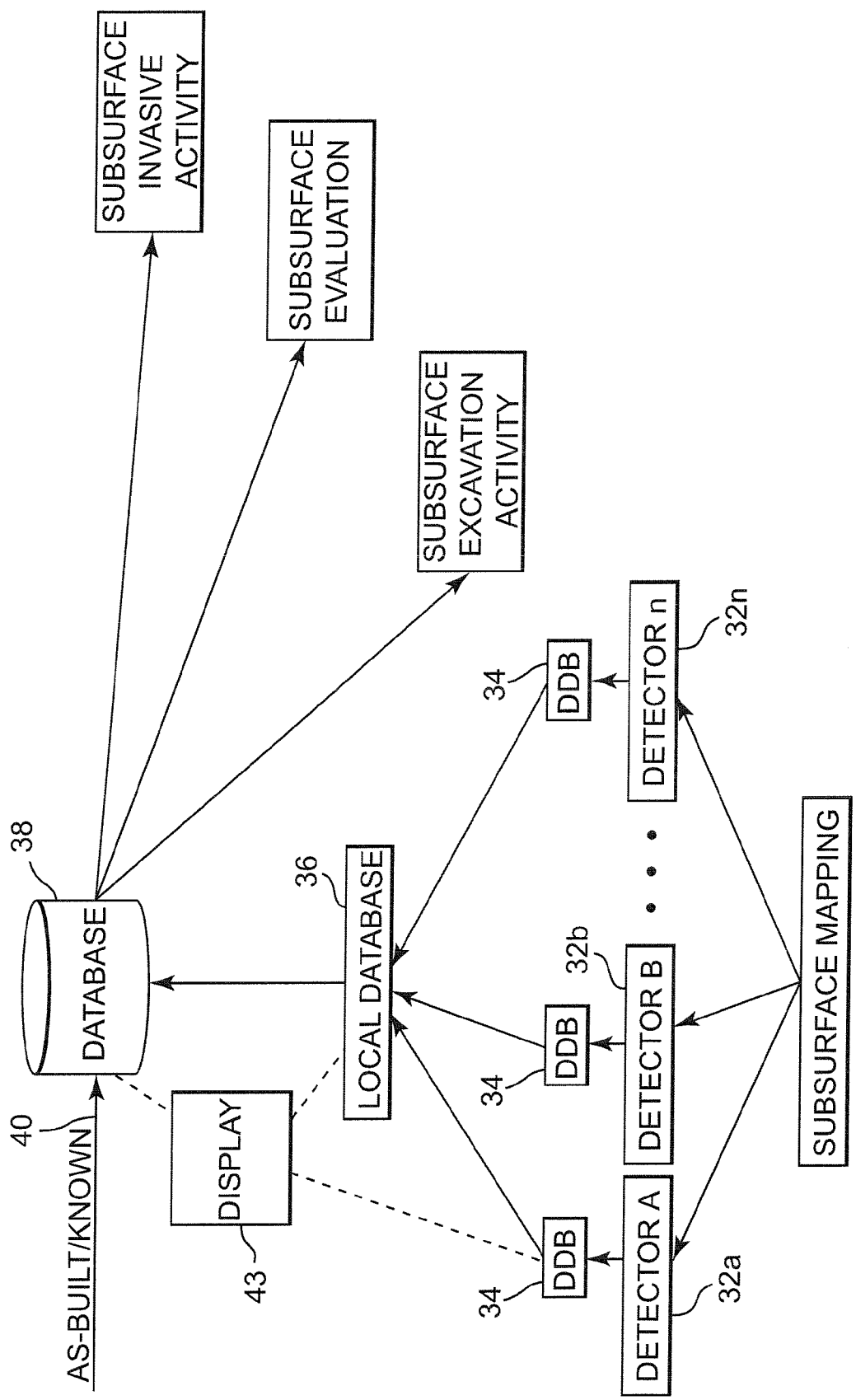
FIG. 2 is a block diagram generally illustrating an aspect of the invention whereby subsurface structures, such as utilities, are mapped and stored in accordance with an embodiment of the present invention.

FIG. 2 is a block diagram generally illustrating an aspect of the invention whereby subsurface structures, such as utilities 24, are mapped and stored. Subsurface mapping occurs by detecting, using any of a variety of known or future subsurface structure detection mechanisms, each of the utilities 24 or other obstructions of interest. In the embodiment of FIG. 2, the detection of the underground utilities 24 is accomplished through the use of a plurality of detector mechanisms, such as detector 32a, detector 32b, through any desired number of detectors represented by detector 32n. In one embodiment, each of the detectors 32 stores retrieved information in a local detector database 34 (DDB), which may in turn be collectively stored in a local database 36. The contents of the local database 36 may further be stored in a central utility location database 38. Other local databases 36 associated with other geographic areas may also supply data to this central utility location database 38.

Various images and data associated with detected utilities 24 at the present site or other sites may be developed using one or more of the local detector database 34, local database 36, utility location database 38, a single detector 32 or multiple detectors 32 and presented on display 43. Raw sensor data, partially processed sensor data, or fully processed sensor data (e.g., fused sensor data) may be presented on display 43. Data may be presented in 2-D or 3-D on display 43 in real-time or quasi-real-time (e.g., delay of a few minutes for certain data). Display 43 may be mounted to the utility mapping system, a remote unit separate from, but in communication with, the utility mapping system, or a subsurface penetrating machine, such as a horizontal directional drilling machine for example.

The central database may also receive "as-built" or other known utility data 40. For example, utility location data may currently exist for certain utilities 24, as the location data may have been manually entered into a database as the utilities 24 were installed. This is generally referred to herein as "as-built" data 40. Further, utility location information may be manually established, from processes such as "pot-holing" where excavation is performed in order to locate existing utilities 24 and record the corresponding location data (one form of "ground truth" data).

It should be recognized that the hierarchy of databases may be configured however desired in accordance with this embodiment of the present invention. In any event, the database containing the location data of the subsurface structures may in turn be accessed in order to assist in further digging, trenching, boring, or other subsurface activity, as illustrated by the retrieval of data in connection with subsurface evaluations, subsurface excavation activities, and other subsurface invasive activities. By having this knowledge at hand, those engaged in such invasive subsurface activities can avoid encountering and damaging existing utilities 24, and greatly mitigate safety concerns that are inherent to such activity.

Figure 3:
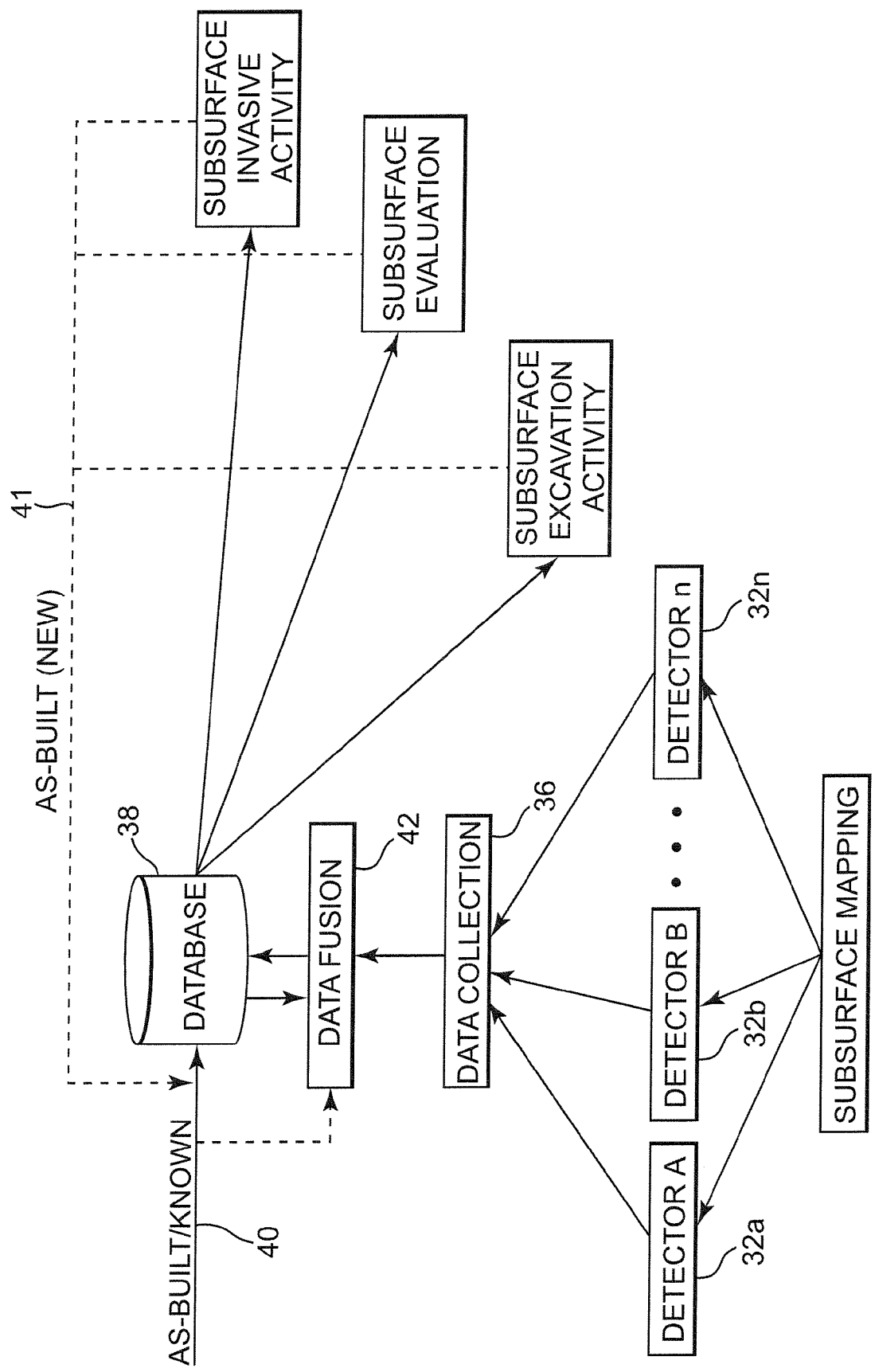
FIG. 3 is a block diagram generally illustrating an aspect of the invention whereby subsurface structures, such as utilities, are mapped and stored in accordance with another embodiment of the present invention.

FIG. 3 is a block diagram generally illustrating another aspect of the invention, further incorporating data fusion principles. As described in connection with FIG. 2, subsurface mapping takes place using any of a variety of known or future subsurface structure detection methodologies, such as via one or more of detector 32a-32n. Each detector 32 provides an indication of the location of the buried utilities 24 or subsurface obstructions. The detectors 32 may incorporate common detection technologies, or may each incorporate different detection technologies to provide a variety of technical judgments on where the utility 24 is located.

In the illustrated embodiment, the data is collected from each of the detectors 32, and provided to a data fusion module 42 that processes the raw data detected by a plurality of the detectors 32. The data fusion module 42 processes data from multiple sensors/detectors 32 by mathematically relating the data to produce a fused identification of the actual location of the buried structures. The location data from the data fusion module 42 generally provides utility location information with a higher degree of accuracy. For example, the data fusion module 42 may implement algorithms that provide a greater weight to information gathered by a certain detector in certain soil conditions, or to information gathered by a particular detector when the underground utility 24 is a particular size or having a particular composition or property.

Alternatively, the location information from a plurality of the detectors 32 may be collectively considered to provide the best estimate of the location of utility 24 using standard averaging or weighted averaging techniques. For example, where multiple detectors 32 provide mapping information that would place a particular utility 24 at a certain location, and one of the detectors 32 provides mapping information that is significantly different from the remaining detectors 32 information, the disparate mapping data may be considered abhorrent information and may thus be discarded from the analysis. As can be appreciated by those skilled in the art, a multitude of data fusion algorithms can be used in connection with the data fusion module 42. Data fusion may be determined in a manner described herein, and in U.S. Pat. No. 5,321,613 entitled "Data Fusion Workstation," issued Jun. 14, 1994 to Porter et al., the contents of which are incorporated herein by reference.

The location data provided by the data fusion module 42 may be stored in the database. Further, existing information in the database relating to the particular utility or utilities 24 of interest may be provided to the data fusion module 42 to assist in the analysis. As-built or otherwise known information 40 can also be provided to the data fusion module 42 to assist in the analysis. As previously described, the as-built or known information 40 may include manually-generated location records from pot-holing or manual measurements as utilities 24 are installed (e.g., ground truth data).

Subsequent underground activities, such as the illustrated subsurface invasive activities, subsurface evaluations, and subsurface excavation activities, can make use of the information stored in the database 38. This allows for more accurate, safe, and efficient utility installations. As these new utility installations take place, the placement and/or location information pertaining to these new installations can be stored in the database as new "as-built" data 41.

This as-built information can be acquired by manual measurements, or preferably by automatic location information resulting from technologies such as those described in U.S. Pat. No. 5,553,407 entitled "Excavator Data Acquisition and Control System and Method of Use", issued Sep. 10, 1996 to Stump; U.S. Pat. No. 5,720,354 entitled "Trenchless Underground Boring System with Boring Tool Location", issued Feb. 24, 1998 to Stump et al.; U.S. Pat. No. 5,904,210 entitled "Apparatus and Method for Detecting a Location and an Orientation of an Underground Boring Tool", issued May 18, 1999 to Stump et al.; and U.S. Pat. No. 5,819,859 entitled "Apparatus and Method For Detecting an Underground Structure", issued Oct. 13, 1998 to Stump et al., the contents of each being incorporated herein by reference, and which generally describe various underground utility and subsurface geologic evaluation and mapping techniques. In this manner, the database can be updated contemporaneously as new utility installations take place.

Figure 4:
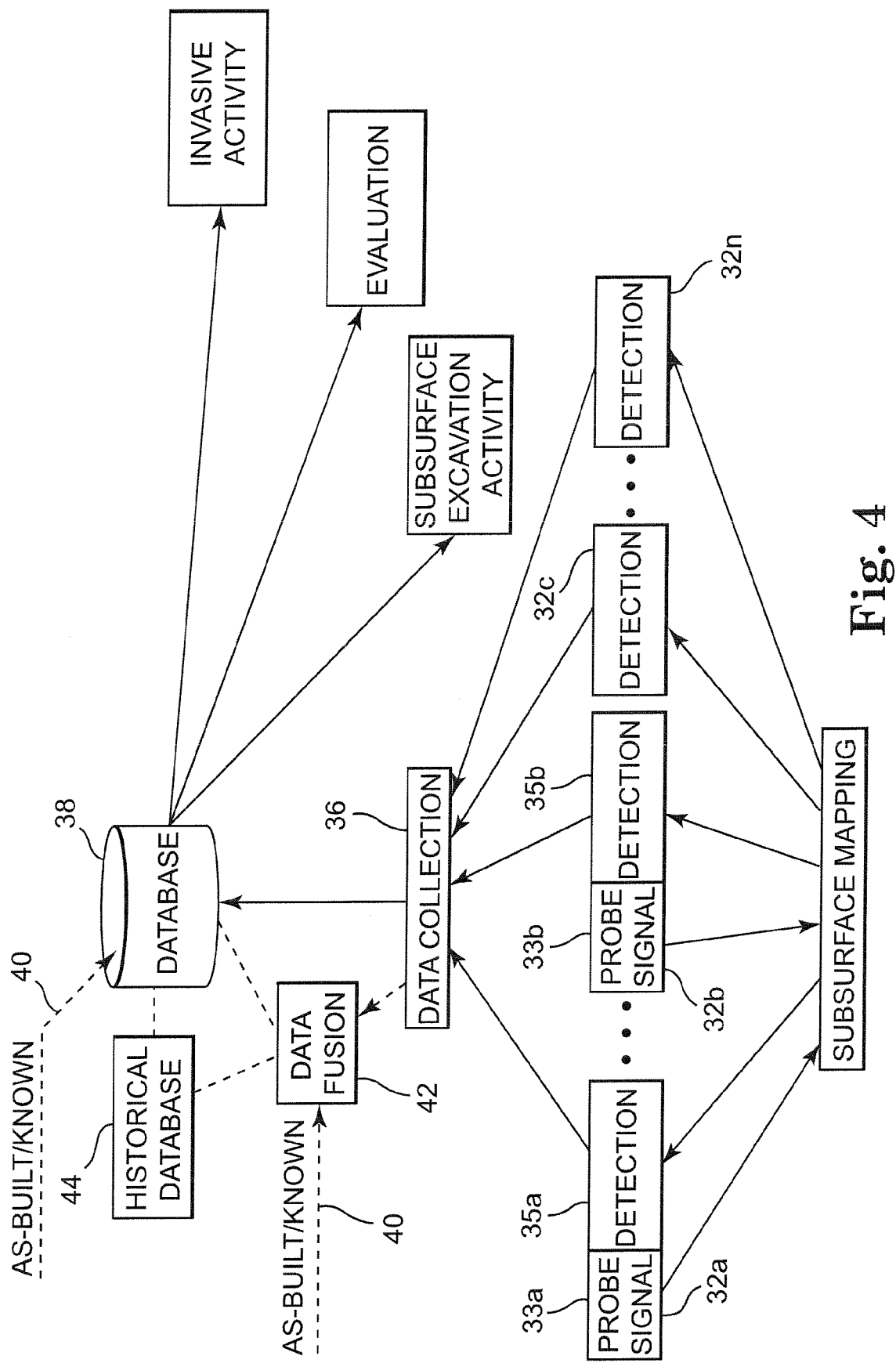
FIG. 4 is a block diagram generally illustrating an aspect of the invention whereby subsurface structures, such as utilities, are mapped and stored in accordance with a further embodiment of the present invention.

FIG. 4 is a block diagram generally illustrating another embodiment of a mapping system in accordance with an embodiment of the present invention. Subsurface mapping occurs using any of a variety of subsurface structure detection systems. In this embodiment, subsurface mapping may result from one or more detection techniques, some of which may operate in connection with subsurface probe signals. For example, a number of mapping methodologies may include a probe signal generator 33a, 33b to transmit a location probe signal into the subsurface. A corresponding detection module 35a, 35b receives the reflected or otherwise responsive signal(s). The responsive signal is indicative of the location of the underground utility 24 or other structure. Alternatively, one or more detection modules 32c, 32n may be configured to receive signals generated below ground, such as via a drill head signal, a signal generated by a signal generator positioned on a utility itself, energy naturally emanating from subsurface structures, or other subsurface-initiated signals. The detected signals are collected in a data collection module 36, where data fusion operations may optionally be applied by data collection module 36. As previously described, "as-built" and other known utility location data 40 may be provided to the data fusion module 42 as a parameter to the associated data fusion functions, and/or may be provided directly to the database 38.

A historical database 44 may also be used in connection with the data fusion module 42. The historical database 44 may contain any desired historical data, such as known soil characteristics proximate the target location, known GPR profiles that are associated with known soil or utility types, excavator difficulty data, or excavator hardware and software configurations (e.g., particular machine type, cutting bit or jet, cutting action, digger chain bits, mud system components and mud additives, etc.) known to be particularly useful for particular soil or job conditions, for example. The historical database 44 may further or alternatively contain preliminary utility location data that may be uploaded to the central database 38 or used in connection with data fusion algorithms.

Where the historical database 44 includes soil or other subsurface characteristics data, the data fusion module 42 may utilize this data in arriving at a resulting utility location. Such historical data may be useful in improving the accuracy of the utility/object location determination and/or the quality or tolerance factor associated with the computed location. Particular soil conditions at a target location may alter or shift a weighted data fusion algorithm to arrive at the most accurate utility location. The data fusion engine may further interact with the historical database 44 which may store earlier-acquired data of varying types which may be useful in the processing the detector data.

Figure 5:
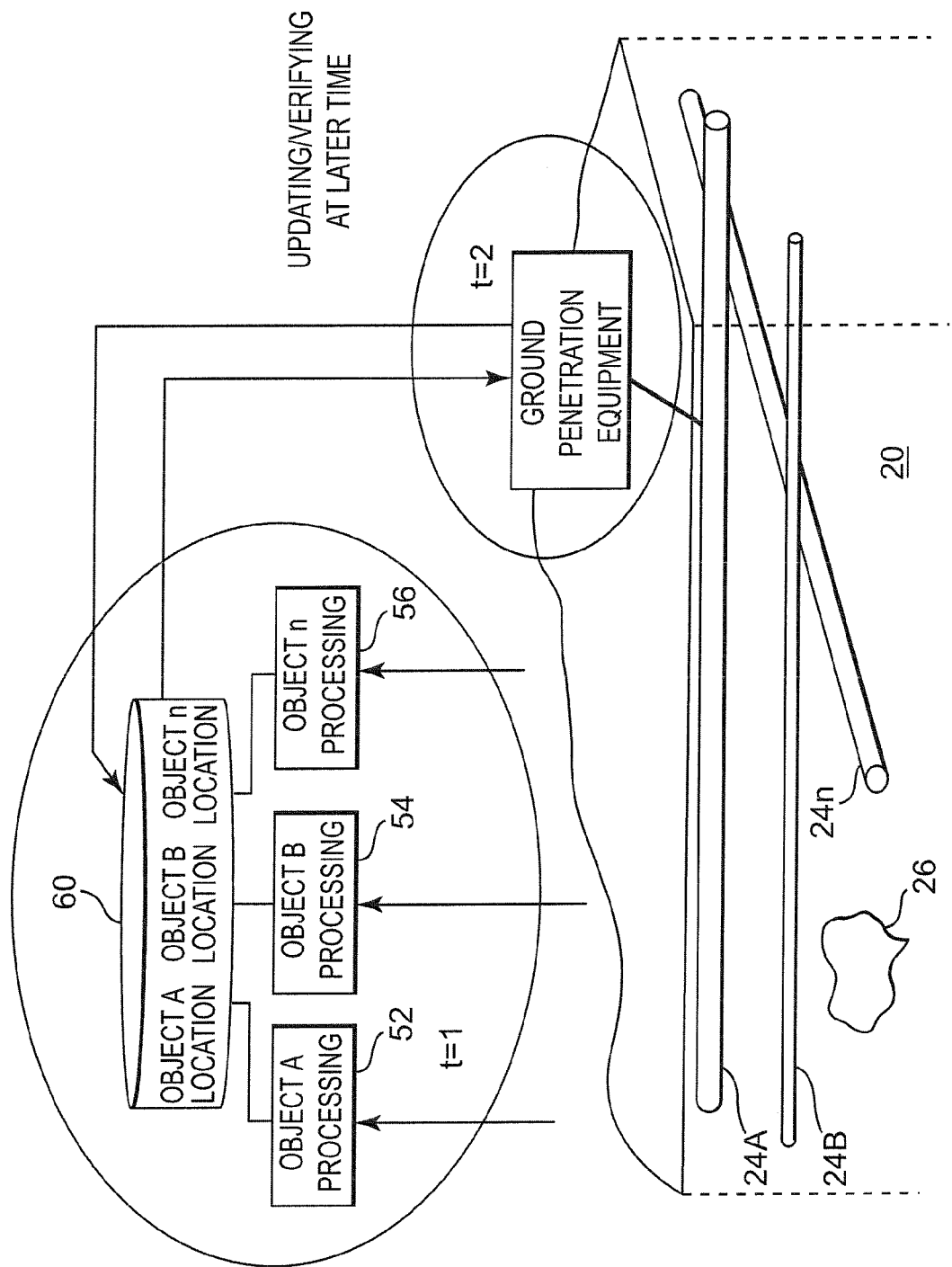
FIG. 5 is a block diagram illustrating another embodiment of a mapping system, including data processing and storing elements, in accordance with the principles of the present invention.

FIG. 5 is a block diagram illustrating another embodiment of a mapping system in accordance with the present invention. In this example, utility conduits 24A, 24B, and 24n are illustrated. Utility conduit 24n represents the n-th utility in an unspecified number of utilities at the subsurface of a particular geographic area. As utilities are detected as described above, the corresponding location data from each enabled detector is processed to determine its actual location. For example, all enabled detection devices (whether sensing a signal responsive to an above-ground probe signal, or sensing a signal generated or emanating below ground) that provide location information for utility conduit 24A are processed via an object A processing module 52.

In a more particular example, a ground penetrating radar (GPR) signal may be generated above ground, and a responsive signal indicative of utility conduit 24A is sensed by a GPR detection module. A second probe signal, such as a seismic or acoustic signal, may be generated and directed towards the subsurface to produce a second responsive signal indicative of the location of utility conduit 24A. Because multiple detectors 32 are implemented in such an embodiment, the multiple resulting location data must be resolved, via object A processing module 52, to determine the most probable and accurate location of utility conduit 24A. By utilizing multiple detection methodologies and applying data fusion principles on the resulting data, more accurate location information can be obtained. Analogous operations are conducted for utility conduit 24B, and all subsurface structures of interest through utility conduit 24n.

The location results for each of the underground utilities 24 are stored in the database 60 at a first time, e.g. t=1. This first time generally reflects the occurrence of the detection and storing operations. At a later time, illustrated at time t=2, subsequent subsurface activity (e.g., trenching, boring, or other subsurface invasive activity) can be guided by the location data stored in the database 60. For example, ground penetration equipment such as trenchless boring equipment can download the utility location information to a bore plan model in order to allow the ground penetration activity to occur without colliding with existing buried utilities 24. Where utilities 24 are installed in connection with the ground penetration activity, the location data can be returned to the database 60 as "as-built" location data. Thus, the database 60 can be updated and/or verified by information ascertained by the ground penetration equipment at a later time (e.g., t=2).

Figure 6:
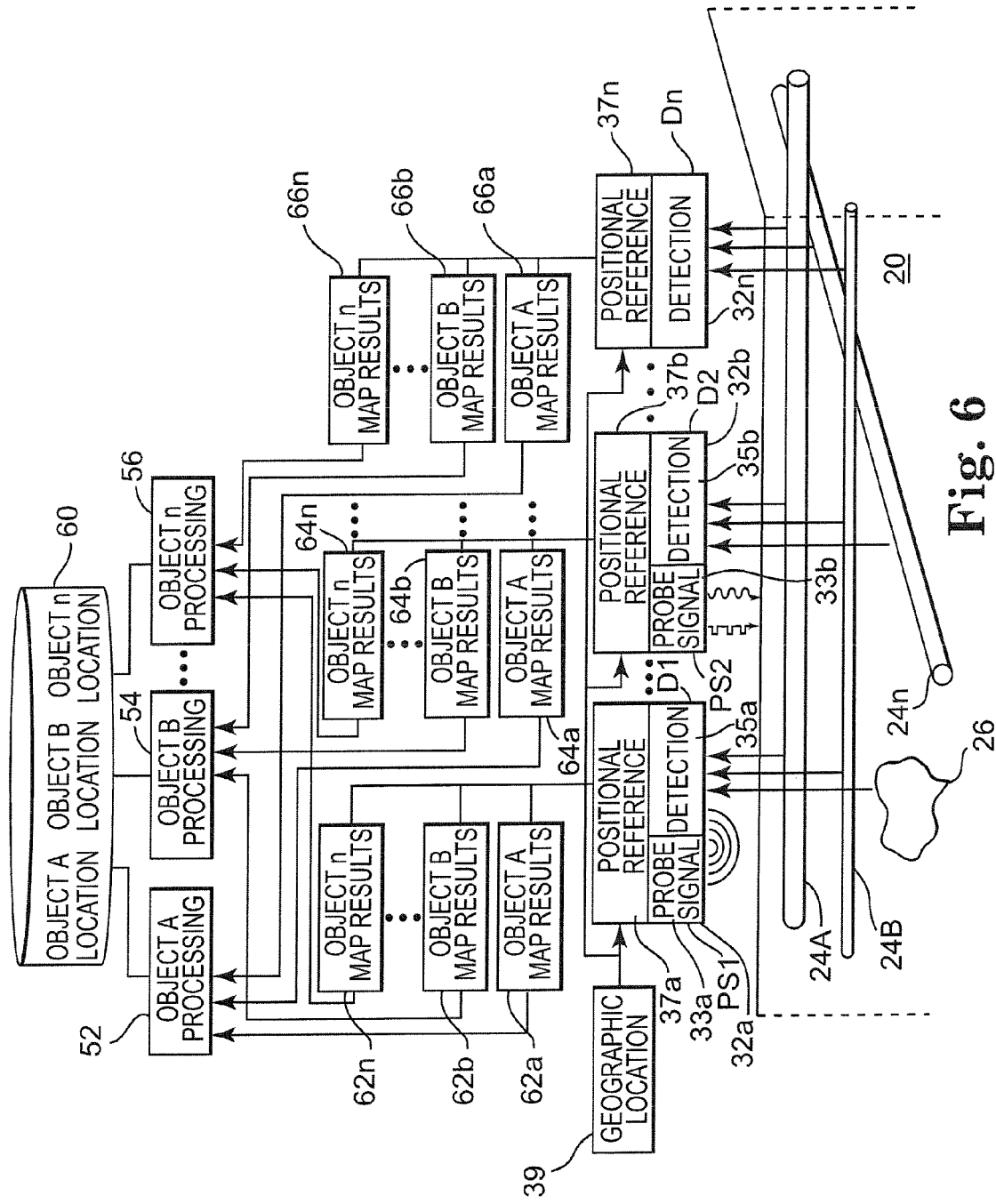
FIG. 6 is a more particular embodiment of a mapping system in accordance with another embodiment of the present invention.

FIG. 6 is a more particular embodiment of a mapping system in accordance with an embodiment of the present invention. As was described in connection with FIG. 5, a plurality of detection units 32 are provided to receive raw data pertaining to the location of a plurality of buried utilities 24, such as utility conduits 24A, 24B through 24n. In some cases, the detection modules 32n may detect signals generated or emanating from below ground. In other cases, the detection modules 32a, 32b may be associated with corresponding probe signals PS1, PS2 associated with various ground penetrating technologies.

A geographic location module 39 provides a geographic reference for the detected utility locations via positional reference units 37. For example, the geographic location module 39 may include a geographic information system (GIS) or geographic reference systems (GRS), which are known systems for characterizing the three-dimensional location of objects within a given volume of earth.

Geographic information systems, for example, allow for storage, display, and manipulation of three-dimensional data. GIS systems provide for the integration of sensor data with other kinds of map data, such as pre-existing utility maps, building and street maps, and pot-hole information (e.g., ground truth data), for example. Since GIS systems can store data in three dimensions, the depths and vertical relationships of the various infrastructure features and sensor data can be accurately maintained. A preferred GIS system integrates GPR, EM (electromagnetic) and seismic sensor data, for example, with existing infrastructure maps. Infrastructure maps can be developed during system testing and mapping.

The geographic location module 39 may also include a global positioning system (GPS) to provide position data for determining the relative geographic position of the buried structures. The positional reference data developed by positional reference units 37 are used in connection with the detected, relative location signals to provide an absolute location indication for the buried utilities 24.

Other useful positioning systems include Differential Global Positioning System (DGPS), laser positioning (LPS) and a survey wheel. A suitable DGPS can simultaneously track 12 GPS satellites and 12 GLONASS (Russian) satellites, and has an accuracy of 1-2 cm in differential mode. DGPS is convenient to use when there is a sufficiently clear space overhead to view a sufficient number of satellites. All communication to the base station is via radio, and as such, no wires are required. An LPS is preferably used when the DGPS does not operate successfully, such as when in a tunnel, near tall buildings, or possibly under heavy tree-cover.

Accurate position sensing is important. When a given utility sensor is used to survey a series of parallel lines, for example, the position at each data point must be well known in order for processing software to combine the data points into accurate 3-D pictures. Even more important is the deleterious effect that erroneous position data may have on automatic target recognition software results, for example. Similarly, each of the sites of utility sensors may be used separately in surveys, if needed or desired. In order for the sensor data fusion to operate properly, the position of each sensor must be known with sufficient accuracy so that the data collected may be properly overlaid.

As seen in FIG. 6, a first probe signal source 33a of detection module 32a may generate a probe signal PS1 that is reflected or otherwise causes a responsive signal to be returned from the subsurface to the detection module D1 35a. As the probe signal PS1 is transmitted through the subsurface, the probe signal source 33a can be moved along the ground surface to map the subsurface of the corresponding area of travel. The returned/responsive signal detected by the detection module D1 35a is thus a function of the probe signal source's position as the probe signal source 33a traverses the ground surface. As utilities 24 and other structures of interest are identified by the detection module D1 35a, the resulting raw location data may be temporarily stored, such as in the object A, B and n map result storage locations 62a-n, 64a-n, 66a-n. Similar operations take place for each of the detection modules 32a-n, such as the detection module D2 32b associated with probe signal PS2, and the detection module(s) Dn 32n detecting subsurface-initiated signals. Each of the detection modules 32a-n may detect multiple underground utilities 24 and structures, storing the results in a corresponding map result storage location 62a-n, 64a-n, 66a-n. Each detection module 32, therefore, provides raw location data corresponding to each of the underground utilities/structures 24 identified by the respective sensor technology.

The resulting data for each location is then processed to arrive at a collective location result. For example, the object A processing module 52 receives the raw location data for a first object, such as utility conduit 24A, from each of the detection modules 32a-n. In one embodiment, the location data is first stored in corresponding temporary storage locations, and the information is then passed to the object A processing module 52 where it is processed to more accurately identify the actual location of the utility conduit 24A. The object A processing module 52 processes the location results for utility conduit 24A from each of the utility sensing devices 32, and outputs a single location for utility conduit 24A based on all of the location data provided by the multiple detectors 32 for utility conduit 24A. Such processing occurs for each subsurface structure of interest, via individual processing modules, an aggregate processing module, distributed processing, or other processing arrangement. The resolved locations for each of the subsurface structures, e.g., utility conduits 24A, 24B through 24n in the example of FIG. 6, are stored in a utility database 60 to maintain the data.

Figure 7:
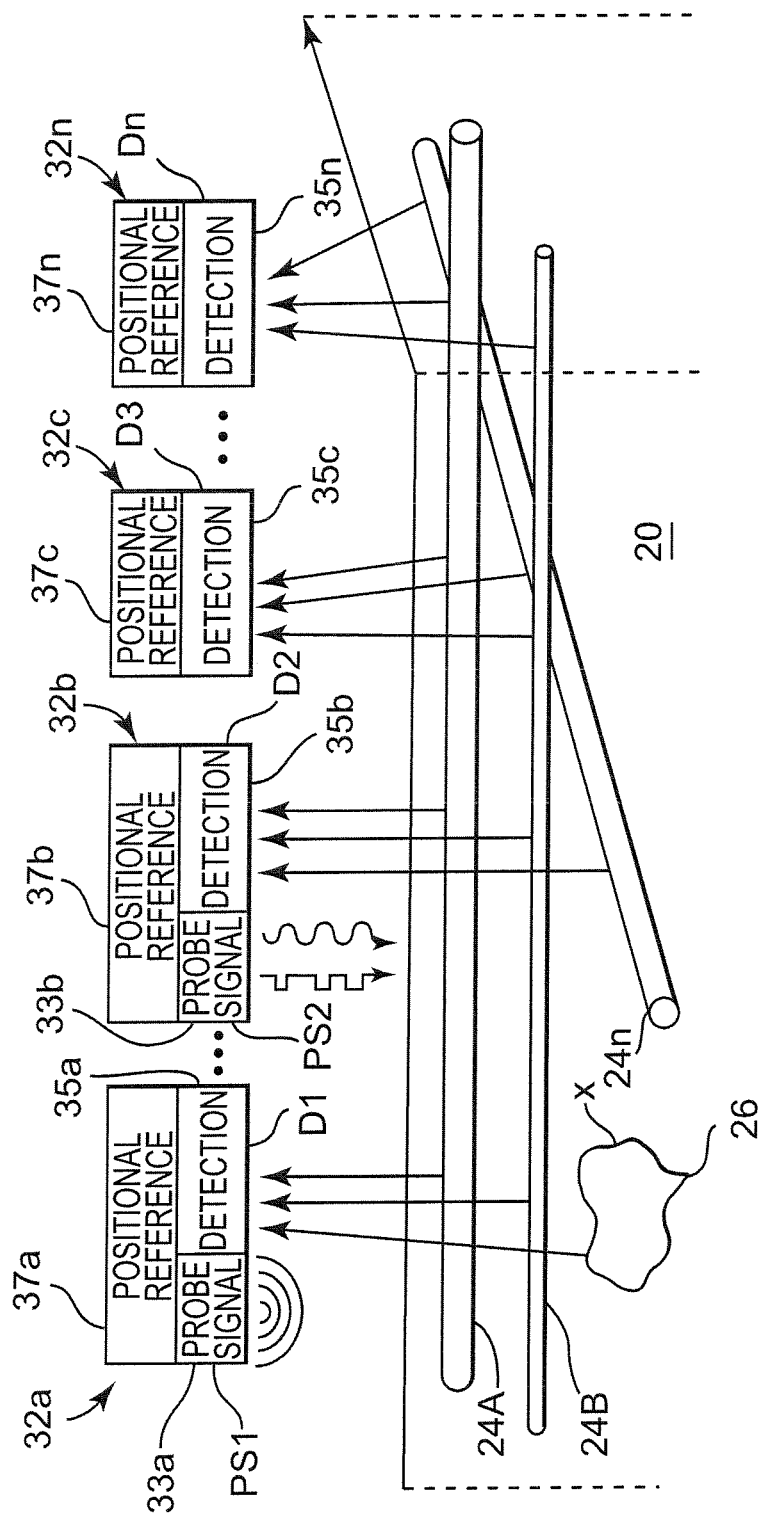
FIG. 7 is a block diagram illustrating various manners in which the detection of subsurface structures can be accomplished according to the principles of the present invention.

FIG. 7 is a block diagram illustrating various manners in which the detection of subsurface structures can be accomplished. These subsurface structures of interest may include utility conduits, building foundations, rocks and other substantially impervious objects, and the like. Generally, any underground object complicating subsequent trenching, boring or other invasive subsurface activity, and/or causing safety concerns, may constitute a subsurface structure of interest in which detection is desired. For instance, in the example of FIG. 7, utility conduits 24A, 24B, 24n are of interest as subsequent invasive subsurface activity could cause damage or present safety concerns if struck. It may also be desirable to detect and record the location of impervious object 26X, as it may present difficulties in trenching or boring activities.

In accordance with the present invention, these subsurface structures are detected using one or more different detection technologies. Because of varying ground characteristics, varying utility and conduit types, soil composition, moisture, structure depth, structure composition, structure contents, and the like, the use of multiple detection technologies provides a greater assurance of actual structure location. This is particularly true where data fusion principles are applied, where one or more of the plurality of detection technologies may present more accurate readings, and thus be accorded greater weight, depending on parameters such as the ground characteristics, utility/conduit types, soil composition, etc. In some instances, the data fusion methodologies applied may simply disregard detection technologies known to be relatively unreliable in the particular environment in which detection is sought.

FIG. 7 illustrates that each of the detection technologies is associated with a positional reference. As earlier described, a geographic location module 39 provides a geographic reference for the detected subsurface structure locations. For example, the geographic location module 39 may include GIS, GRS, GPS, LPS, or other position-identifying technologies, resulting in positional references that are used in connection with the detected, relative location signals to provide an absolute location indication for the underground structures.

In the particular embodiment of FIG. 7, multiple detection technologies are illustrated. A first detector D1 35a is used in connection with a probe signal PS1 that presents one of a variety of different available probe signal technologies. For example, the probe signal PS1 may be a ground penetrating radar (GPR) signal that is transmitted into the ground, resulting in reflected signals from utility conduits 24A, 24B and from object 26X. In one embodiment, the probe signal/detection module 32a travels along the ground surface, such that the associated positional reference changes with positional reference unit travel, and provides a map of the subsurface in response thereto. Other probe signal/detection modules 32b-n may also be used. For example, the detector D2 35b may be used to detect reflected or otherwise responsive signals from one or more probe signals PS2 provided by probe signal source 33b. The particular probe signal technology that is employed governs the type of signal actually transmitted into the earth.

In other embodiments, no probe signal is transmitted from above ground, such as depicted by detectors D3 35c and Dn 35n. In these embodiments, signals originating or otherwise emanating/radiating from the subsurface objects themselves are detected. For example, utility conduits 24 may be equipped to generate signals that can be detected by the detectors D3 35c and Dn 35n, or the underground object may exhibit certain distinguishable characteristics that can be detected (e.g., heat, magnetic field, etc.). In each of these instances, a particular detection technology may be better suited to detect a particular type or group of underground structures. The use of multiple detection mechanisms therefore provides location data in a variety of geographic areas with a greater degree of certainty than the use of a single technology.

Figure 8:
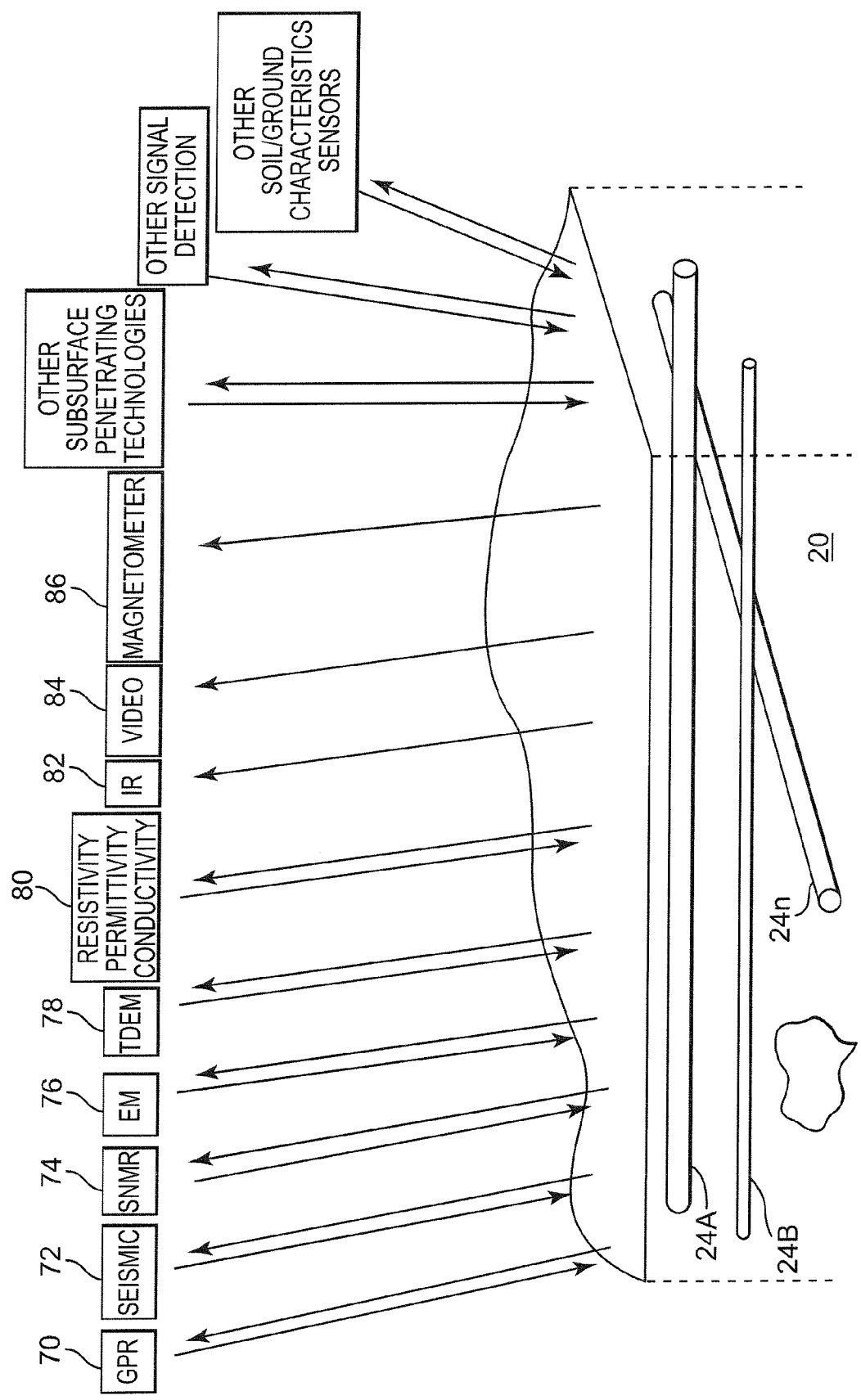
FIG. 8 illustrates various exemplary probe signal and/or detection technologies that may be used in connection with the embodiments of the present invention.

FIG. 8 illustrates various example probe signal and/or detection technologies that may be used in connection with the present invention. Ground penetrating radar (GPR) 70 may be used to obtain geologic and subsurface structure imaging data developed from electromagnetic return signal information resulting from a probe signal transmitted into the earth. Seismic (e.g., shear wave seismic) or acoustic probe signals 72 may be used to detect buried structures of sufficient acoustic contrast relative to the frequency of the acoustic probe signals.

The complementary use of GPR 70 and a seismic detection system 72 provides the ability to detect and map utilities in a wide range of soil types. For example, a subsurface that contains a predominate amount of clay decreases the GPR system's ability to reliably detect an object (particularly object depth) within such a subsurface, but has no appreciable affect on the seismic system's detection capability. By way of further example, a subsurface that contains a predominate amount of sand decreases the seismic system's ability to reliably detect an object within such a subsurface, but has no appreciable affect on the GPR system's detection capability.

Two major factors determine the propagation of electromagnetic energy, including GPR beams, below the subsurface—the dielectric constant and the soil conductivity. The dielectric constant determines the speed of propagation. This information is necessary to determine the actual depth to objects, rather than only relative depth or simply noting the presence of reflectors. The soil conductivity determines the energy lost as the radar beam propagates through the ground, which largely determines the depth of penetration, and hence visibility beneath the surface. GPR signals experience limited penetration into the ground when the electrical conductivity of the soil is too high. Soils containing too much clay, water or mineral constituents, for example, cause GPR signal penetration to decrease, due to the high conductivity of clay soil. Lowering the frequency of the signals used can increase the depth of penetration, but lower frequencies have poorer resolution, thereby limiting utility size and spacing detection resolution.

The detection capability of a GPR system 70 suitable for use in the embodiment of FIG. 8 may be improved by employment of improved antenna designs, such as by adding multiple antennae to a single GPR sensor unit to enhance the utility of the GPR system 70. Multiple antennae allow for better detection of utilities that are not at optimum angles to the traverse of a single antenna. Also, having an independent means of estimating soil conductivity and dielectric constant, such as by use of an electromagnetic (EM) sensor 76, can be of much assistance in processing GPR data. Furthermore, having a measurement of these parameters as a function of depth, rather than a single estimate representing some form of average parameter, may be used to enhance the radar image. Lower frequency (relative to GPR) EM sensors 76 can be used for these purposes. EM sensors 76 may be used to map utilities by themselves under favorable conditions in conductive soils.

Although the above-described design changes may improve GPR system detection capabilities for certain soil types, overall GPR system performance significantly degrades when scanning highly conductive soil environments, notwithstanding such design improvements. For soil types that are so conductive as to practicably or totally eliminate GPR 70 as a detection or mapping tool option, sensors based on other technologies are employed that are less sensitive or insensitive to highly conductive soil types.

One such technology that offers superior detection characteristics in clay and other highly conductive soil types is a shear wave seismic technology. Since seismic waves are propagated by a physical mechanism completely different from that of radar beams, seismic waves are not affected by soil conductivity.

The ability to detect and map utilities is also a function of the resolving power of a sensor measurement. Resolution is a function of the wavelength of the signal being measured. This relationship applies to both electromagnetic and seismic systems. Shorter wavelengths can resolve smaller targets in the subsurface. Seismic systems have traditionally been used to map geologic features that are at much greater depths than utilities, and is done with relatively low frequencies. Mapping very near the earth's surface, as opposed to deeper, using seismic waves is a very challenging and heretofore unaddressed endeavor.

In addition to providing detection data in soil types that render GPR systems 70 unreliable or unusable, a seismic system 72 of the present invention provides for the generation and processing of wavelengths approaching those obtained with GPR, such as wavelengths above 1 kHz (e.g., in the range of about 3 kHz to 5 kHz). It is understood, however, that meaningful detection information may be developed using a seismic system, such as a shear wave seismic system, that provides for the generation and processing of wavelengths of about 1 kHz or less, and that such a seismic system may be employed within the context of the present invention.

A seismic signal vibrator, for example, can be used to operate in the desired frequency range for utility detection and mapping purposes. The use of disparate detection signal types (e.g., radar signals and seismic signals) of approximately the same wavelength provides the opportunity to detect underground objects and geologic features with similar resolution. The disparate detection signal types of approximately the same wavelength can be processed in a similar manner, thereby increasing processing efficiency and decreasing processing complexity and cost.

For best sensitivity, the wavelength should be comparable to the diameter of the utility pipe. This constraint places limitations on the maximum depth at which the utility will remain detectable, which, in the case of GPR 70, could be significantly less than 15 feet in more highly conducting soils. Similar considerations apply to medium and high frequency seismic waves, depending on soil conditions. For cases where both GPR 70 and seismic systems 72 have difficulties, other detection techniques, such as EM 76, NMR 74, and tomographic techniques, may be employed.

In general, detection of an object of sufficient acoustic contrast is possible when the object is greater than ⅛ the wavelength of the dominant frequency of the propagating acoustic signal. The wavelength-frequency relationship is as follows:

$$v=f\lambda$$

where:
v=propagation velocity
f=frequency
λ=wavelength

Using the relationship above, detecting a ⅜-inch object, for example, requires a wavelength of about 3 inches or ¼ foot.

Shear waves, in contrast to compressional waves, are particularly well suited for detecting objects having a size approximating that of most utilities of interest because shear waves travel at about ¼ to ⅛ the velocity of compressional waves in unlithified soils. The slower velocity implies shorter wavelengths for a given frequency. Creating high source frequencies can be a difficult task, so utilizing shear waves reduces design difficulties.

Velocities of shear waves suitable for utility detection are on the order of 500-800 feet/sec (fps). This wave velocity range implies that suitable seismic detection transducers (e.g., vibrator and velocity transducers, such as active or passive geophones) are sensitive to frequencies in the 2,000-3,200 Hz range. It is noted that detection of an object of this size with compressional waves would require frequencies on the order of 20 kHz. In one embodiment, a suitable seismic transducer sensitive to frequencies in the 2000-3200 Hz range incorporates accelerometers. The accelerometers may be active or passive in design. A shear wave seismic transducer suitable for use and adaptation in the context of the present invention is disclosed in U.S. Pat. No. 6,119,804, issued Sep. 19, 2000 to T. Owen, and entitled "Horizontally Polarized Shear-Wave Vibrator Seismic Source," which is hereby incorporated herein by reference.

It is desirable, but not required, to provide a high frequency vibrator of the seismic system 72 having a relatively small footprint, such as on the order of about ½ inch. A vibrator of such size increases portability of the seismic system 72. For example, a high frequency seismic vibrator suitable for many applications that produces a peak force output of 25 pounds may weigh about 40 pounds. A shear wave seismic sensor suitable for use in the field when detecting underground utilities, objects, and geologic strata preferably includes a high frequency seismic vibrator and two spatially separated receive transducers. A recorder and processor are preferably included as part of the sensor assembly.

Electromagnetic (EM) probe signals 76 of relatively low frequency (e.g., 300 Hz to 20,000 Hz) can be used to acquire subsurface data to identify subsurface structures and soil characteristics. In one embodiment, the EM sensor 76 may be implemented to include a single transmitter coil and a single receive coil. Such an implementation represents a comparatively low cost sensor configuration of reduced complexity. In accordance with another embodiment, a multiple-coil, variable frequency tool is designed to detect utility pipes and cables. For example, one EM sensor configuration includes a transmitter and receiver coil with a six-foot separation. This sensor operates from frequencies of 330 Hz to 20,000 Hz. This coil separation is good for deep penetration, but may have reduced resolution for near-surface operation. Another EM sensor configuration includes one receive coil and two or three transmit coils. One transmit coil can be co-located with the receive coil for increased spatial resolution. One or two additional coils may be spaced out to provide multiple offsets that will provide depth information. The fact that each pair operates at multiple frequencies provides additional depth information.

The EM sensor 76, according to one embodiment, has maximum sensitivity in the surface to 15 feet depth zone. As will be discussed below, the data from this sensor 76 can be used as part of the data fusion as both background conductivity information for the inversions, as well as information on those utilities and structures that it can detect, such as trench boundaries, bedrock, water layer and other physical features that have conductivity contrast with the surrounding soil.

Nuclear magnetic resonance (NMR) 74, also referred to as magnetic resonance imaging (MRI), may be adapted for near surface imaging (surface NMR or SNMR) for purposes of locating buried utilities 24 and other structures, and determining soil characteristics. NMR is a magnetic measurement that perturbs magnetic dipole moments and measures resonance frequencies that are diagnostic of the presence of specific materials. NMR or MRI images are made by inducing spin in those protons with a strong magnetic field and then measuring the signals produced when the spin states decay with time.

The presence, absence or variation in water content, for example, can be detected with magnetic resonance signals. Mapping vadose zone subsurface water content, for example, may be accomplished using surface nuclear magnetic resonance (SNMR). NMR images can be made in the subsurface. The transmitters and receivers of the NMR sensor 74 can be configured to measure important signals from the surface or with vertical probes pushed into the ground at intervals along the survey path.

Time-domain electromagnetic (TDEM) techniques 78 are high-technology forms of dowsing, or groundwater exploration, used to search for underground bodies of water (aquifers). The technique employs a grid pattern of electric wires placed on the surface of the ground. The wires are charged with a rapidly pulsating electric current and the resultant electronic "echoes" are carefully analyzed. The data is then used to construct a three-dimensional computer model of the water-bearing potential of underground rock formations and sediment layers.

A soil conductivity, resistivity, and/or permittivity sensor 80 may be used to determine the electrical properties of the soil subject to a mapping operation. As was discussed previously, two factors that impact the propagation of electromagnetic energy, including GPR beams, below the subsurface are dielectric constant (permittivity) and soil conductivity. The dielectric constant determines the speed of propagation. Obtaining this information using a permittivity sensor 80 provides for the determination of the actual depth to objects, rather than only relative depth or simply noting the presence of reflectors. The soil conductivity determines the energy lost as an EM signal propagates through the ground, which largely determines the depth of penetration, and hence the imaging quality of the subsurface. EM signals experience limited penetration into the ground when the electrical conductivity of the soil is too high. One or more sensors 80 may be employed to measure soil conductivity, resistivity, and/or permittivity.

Infrared (IR) 82 is a passive manner of detecting thermal conditions of the subsurface. Video 84 may also be used to evaluate excavated areas and to visually monitor the operation of various mapping and excavator devices and systems. Distinguishing relative magnetic field strengths at targeted subsurface areas can be performed using a magnetometer 86, which detects magnetic fields generated by the normal magnetic field of the earth and disturbances thereto made by ferrous objects.

Other subsurface penetrating technologies and signal detection technologies may also be used within the scope of the invention. For example, push technologies may be employed, where an instrumented cone is pressed into the ground to allow various measurements to be made. Cone penetrometer (CPT) technology provides for the determination of the depth dimension in very difficult situations.

According to one aspect of the invention, a utility detection system that incorporates one or more of the instruments depicted in FIG. 8 may be accessed and controlled from a remote site. For example, a remotely implemented customer support service may utilize a wireless (or land line) link to access the utility detection system. Using such a link, diagnostics of the system's instruments may be performed. Each of the utility detection systems in the field can be accessed over the Internet, tests can be initiated, and download results may be received by a home office. The utility detection systems preferably include built-in diagnostics to assist in production and troubleshooting. Built-in self calibration routines may also be executed for each of the instruments provided in a particular utility detection system. These enhancements are designed to minimize the non-productive requirements on the operator and to reduce downtime.

Figure 9:
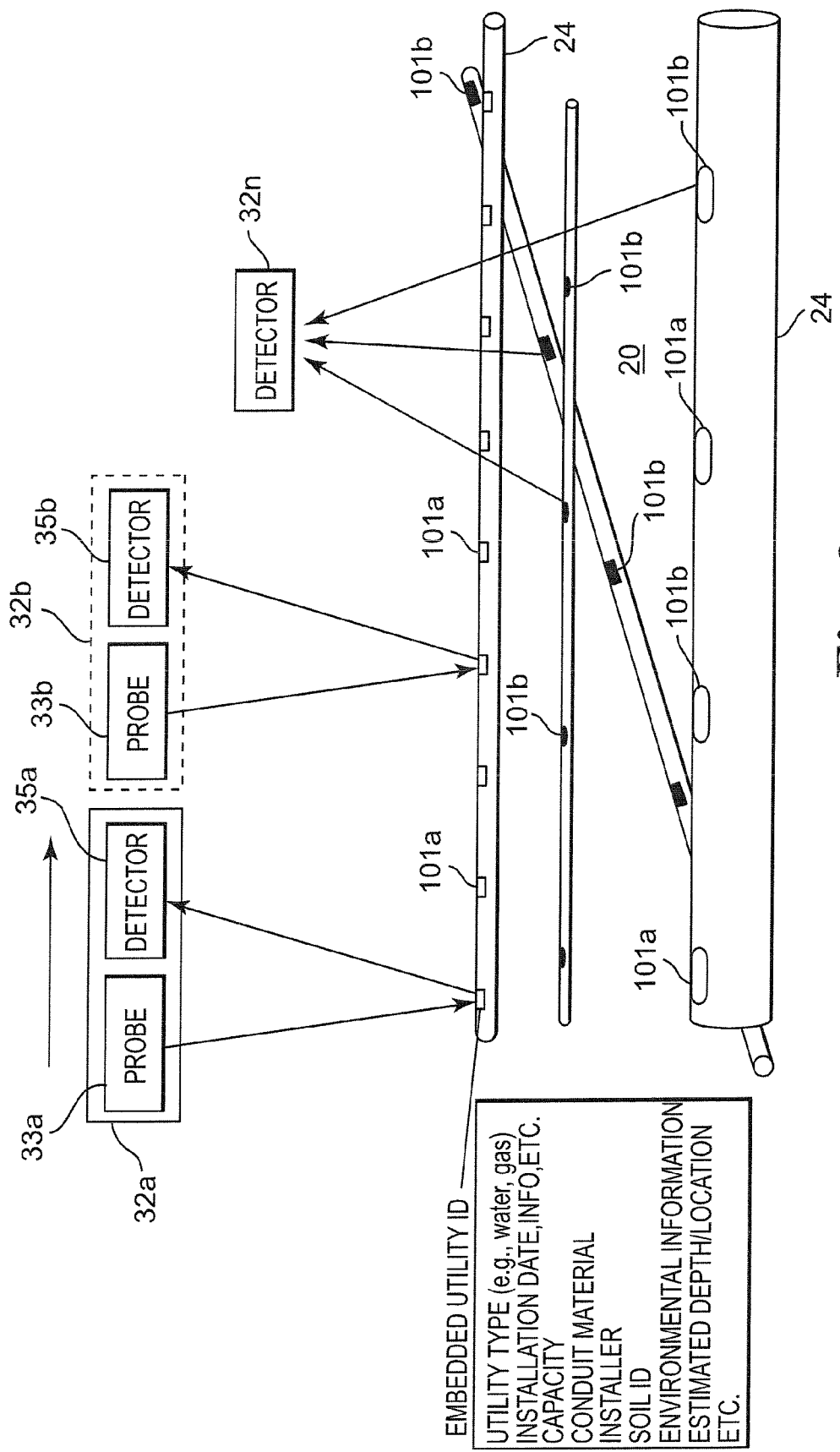
FIG. 9 illustrates an embodiment of a subsurface detection methodology that provides for detection of one or more subsurface utility structures equipped with embedded utility Ids.

FIG. 9 illustrates an example of a subsurface detection methodology that may be used in connection with the present invention. In this embodiment, one or more of the subsurface utility structures are equipped with embedded utility IDs 101. These utility IDs 101 may include embedded information such as utility type (e.g., water, sewer, gas, cable, fiber optic, etc.), installer identification, installation date and other installation information, utility capacity, conduit material or composition, environmental information such as soil information, estimated or desired depth/location information, installed depth/location information, and the like. In this embodiment, utility information may be provided as the utility is installed, i.e., "as-built." Probe/detector modules 32a, 32b may be used to subsequently identify the location of these buried utilities 24 by transmitting a probe signal to the utility, in which a responsive signal is returned via the utility ID 101a with the embedded information. Alternatively, the embedded utility ID 101b may provide an originating signal that can be detected by a detector 32n above ground. In either case, the embedded utility IDs 101 can provide more specific information relating to its associated buried utility.

Figure 10:
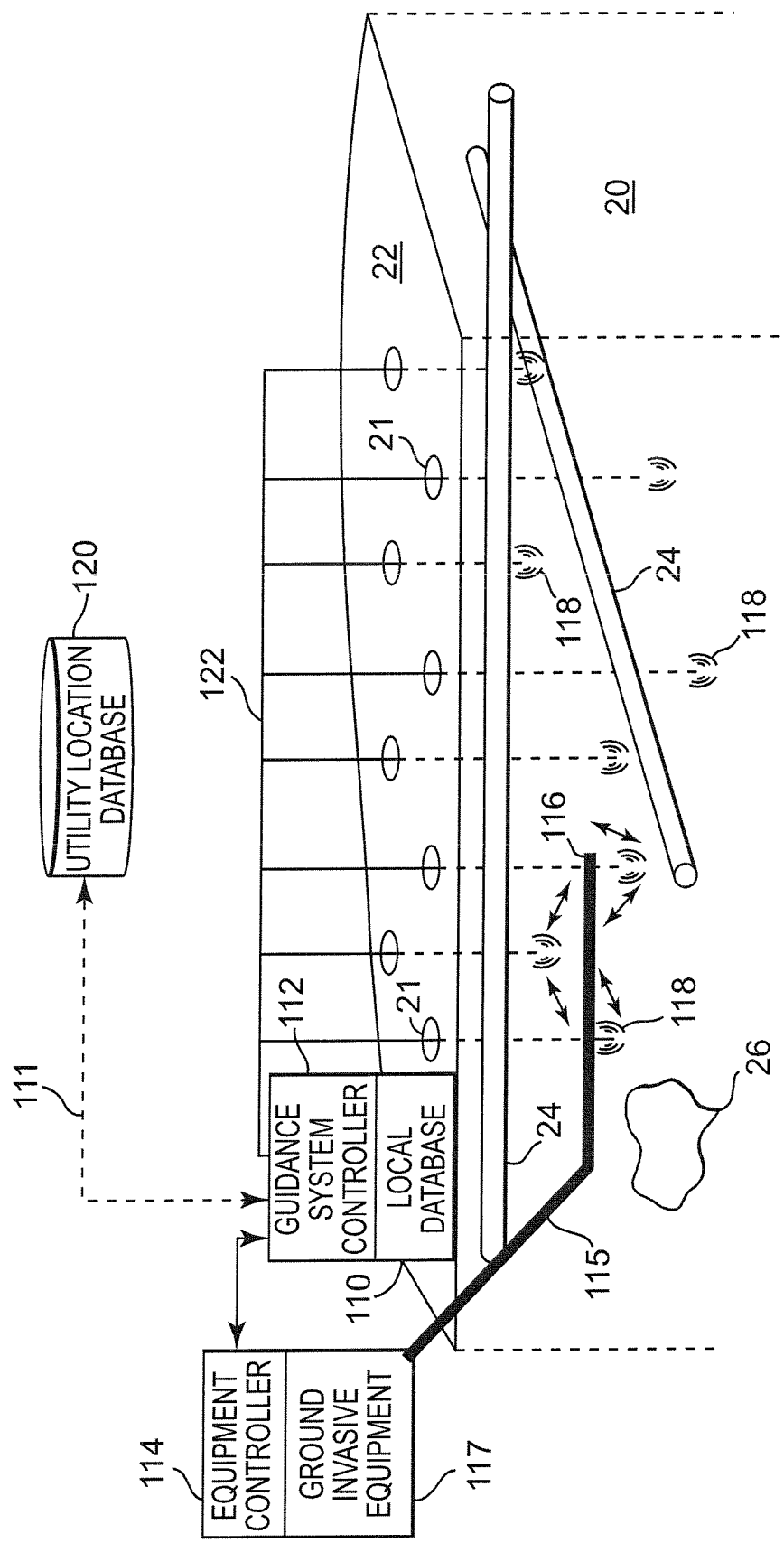
FIG. 10 illustrates an "early warning" or "critical pathway guidance" system according to an embodiment of the present invention.

The embodiment of FIG. 10 illustrates an "early warning" or "critical pathway guidance" system that may be used in connection with the present invention to provide subsurface structure location data. This particular embodiment is particularly advantageous in connection with a utility mapping service and/or utility location database 120 maintenance service.

The "critical pathway guidance" system is a local area tracking and communication system that need not be directly attached to any one utility 24, but includes sensing devices and a computer/database in the area. This local database 110 stores utility location information locally, and may optionally be connected via phone, internet, or other connection 111 to a larger facility, such as the utility location database 120. The system determines the location of the utilities 24 in its working area, and can track and communicate with horizontal directional drilling (HDD) drill heads and reamers 116 entering and passing within its working area. Such a system can be permanently installed in a geographic area, and the subsurface structure location data can be stored in the local database 110 so that subsequent subsurface activity can draw upon, and update, the information stored in the local database 110 when new subsurface activity occurs.

The critical pathway guidance system may also be used in the process of updating the utility location database 120. In one particular implementation, the system communicates with a drill head 116 entering the system area of influence having a cooperative communication and tracking technology. This cooperative communication is realized by drilling down into the ground, and installing sensing/detection devices 118 underground via the drilled holes 21. These devices 118 may be physically separate from the utilities 24 themselves, and may incorporate various technologies such as those using high frequency electromagnetic (EM) signals, so that these devices 118 can communicate with a drill head 116 associated with a trenchless boring system 117. The sensing/detection devices 118 can communicate with the drill head 116 to direct the drill head 116 around obstacles or otherwise direct the drill head 116 along an appropriate path. The devices 118 may be linked via a communication link 122 to a controller 112 to appropriately direct the location data to the local database 110 and/or a central utility database 120. This location data provides accurate as-built location information.

Further, the underground sensors 118 can detect the presence of the drill head 116 (e.g., directly, or through drill head 116 signals, etc.). This information may be provided to the boring equipment 117 in a feedback configuration via the guidance system controller 112. In such a situation, the drill head 116 is detected by the underground sensors, and the drill head 116 is controlled by intelligence within the boring equipment 117 itself through feedback to the boring equipment 117. For example, the borehead 116 can acknowledge signals from the sensors/detectors 118, and communicate this acknowledgment to the controller 114 of the boring equipment 117 (e.g., via signals from the borehead 116 along the drill rods to the boring equipment 117). In another embodiment, the acknowledgment signals can be transmitted through the sensors/detectors 118 to the guidance system controller 112 and/or to the equipment controller 114 to provide further control of the borehead 116. The controllers 112, 114 of the guidance system and boring/trenching equipment 117 communicate awareness and proximity data as the borehead 116 passes through the sensitivity range of the array of sensors/detectors 118.

When the boring is complete, the local database 110 in the critical pathway guidance system is automatically updated with the as-built information of the new utility. The resulting data can optionally be uploaded to a master utility location database 120 outside the working area of the system. This implementation provides a solution to the problem of updating the database for new installations.

Figure 11:
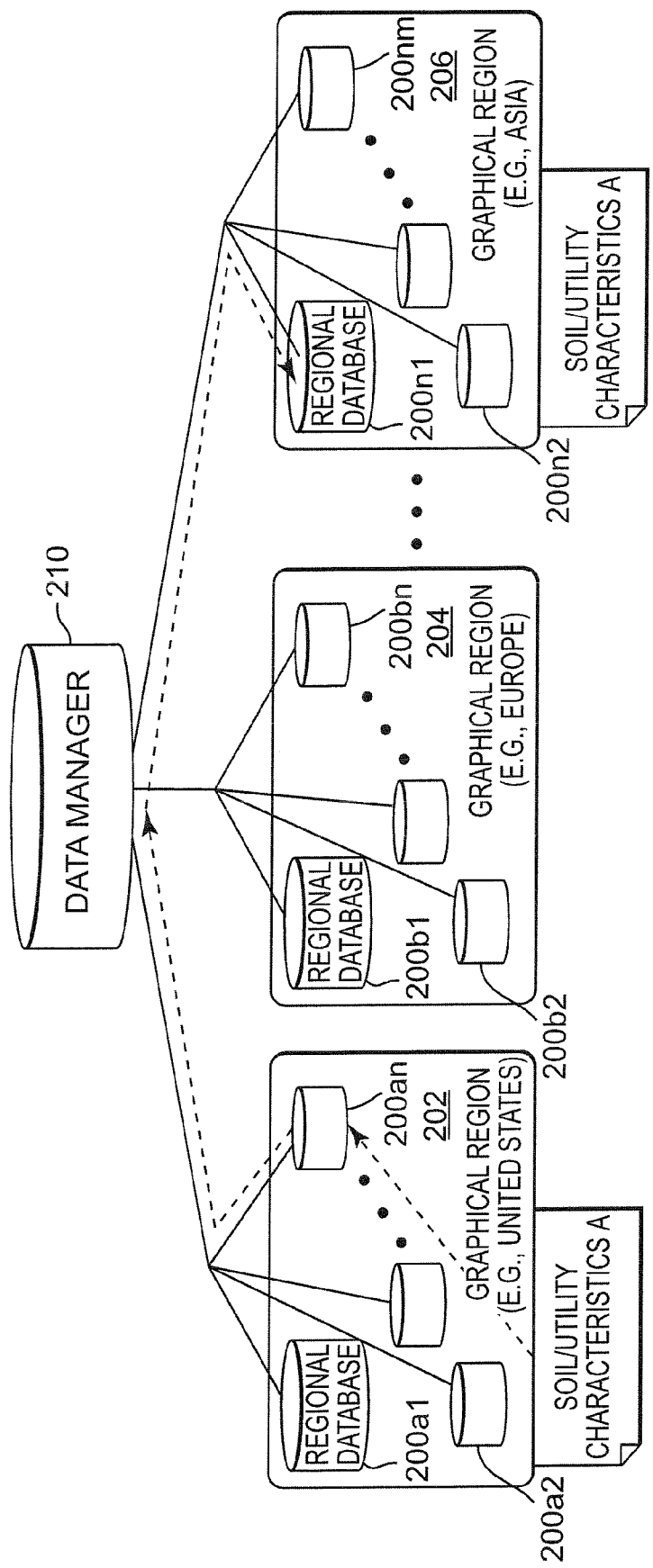
FIG. 11 is a block diagram generally illustrating various manners in which mapped utility location data may be stored and maintained.

FIG. 11 is a block diagram generally illustrating various manners in which the mapped utility location data may be maintained. A database is used to maintain the mapped utility location data. The database may be comprised of a single database in which all mapping information is stored. For example, an aggregate database to collect all utility location data for all mapped areas may reside on a single or distributed computing system, or may be comprised of a distributed database over a distributed or networked computing system. A database hierarchy may also be employed, such that raw location data is locally stored, then aggregated in another database associated with a larger geographic region, and so forth.

The illustrative database configuration of FIG. 11 depicts an embodiment wherein regional databases 200 are provided within a predetermined geographic area. For example, multiple regional databases 200 may be associated with a first geographic area 202, such as the United States. Utility location data mapped within a first predefined area 202 of the U.S. may be stored in a first regional database $200a_1$. Utility location data mapped within a second predefined area 202 of the U.S. may be stored in a second regional database $200a_2$. Each predefined subdivision of the U.S. is thus associated with a particular regional database 200. Regional databases 200 can also be implemented in other predetermined geographic areas, such as other continents, countries, etc (e.g., regions 204, 206). The result is a distributed database comprising the regional databases 200 for each of the geographic subdivisions of interest. These regional databases 200 may optionally be accumulated in a central database (not shown). Such a central database may employ data coherency protocols well-known in data storage arts to ensure that distribution of the central database's copy of a potentially shared database record is disallowed when a corresponding regional database record has been updated.

The data from regional databases 200 may also be coupled to a data manager 210 to facilitate sharing of certain information, such as soil or utility characteristics. For example, a manner of maximizing utility detection and associated data fusion principles may be found for particular soil characteristics in the U.S. 202, such as soil characteristics A. This information may be stored in a regional database $200a_1$ in the U.S. 202, and subsequently downloaded to a regional database $200n_1$ via the data manager 210 in, for example, Asia 206. This information may assist in mapping utilities in regions of Asia 206 where analogous soil conditions are found.

It should be noted that various database structures may be employed within the scope of the invention. For instance, the example of FIG. 11 may represent multiple regional databases 200 which share little or no information among themselves, may alternatively represent a distributed database of regional databases 200, or the data may be collected in a single database. In any event, the collective utility location data is stored such that it can be used in subsequent invasive subsurface activities.

Figure 12:
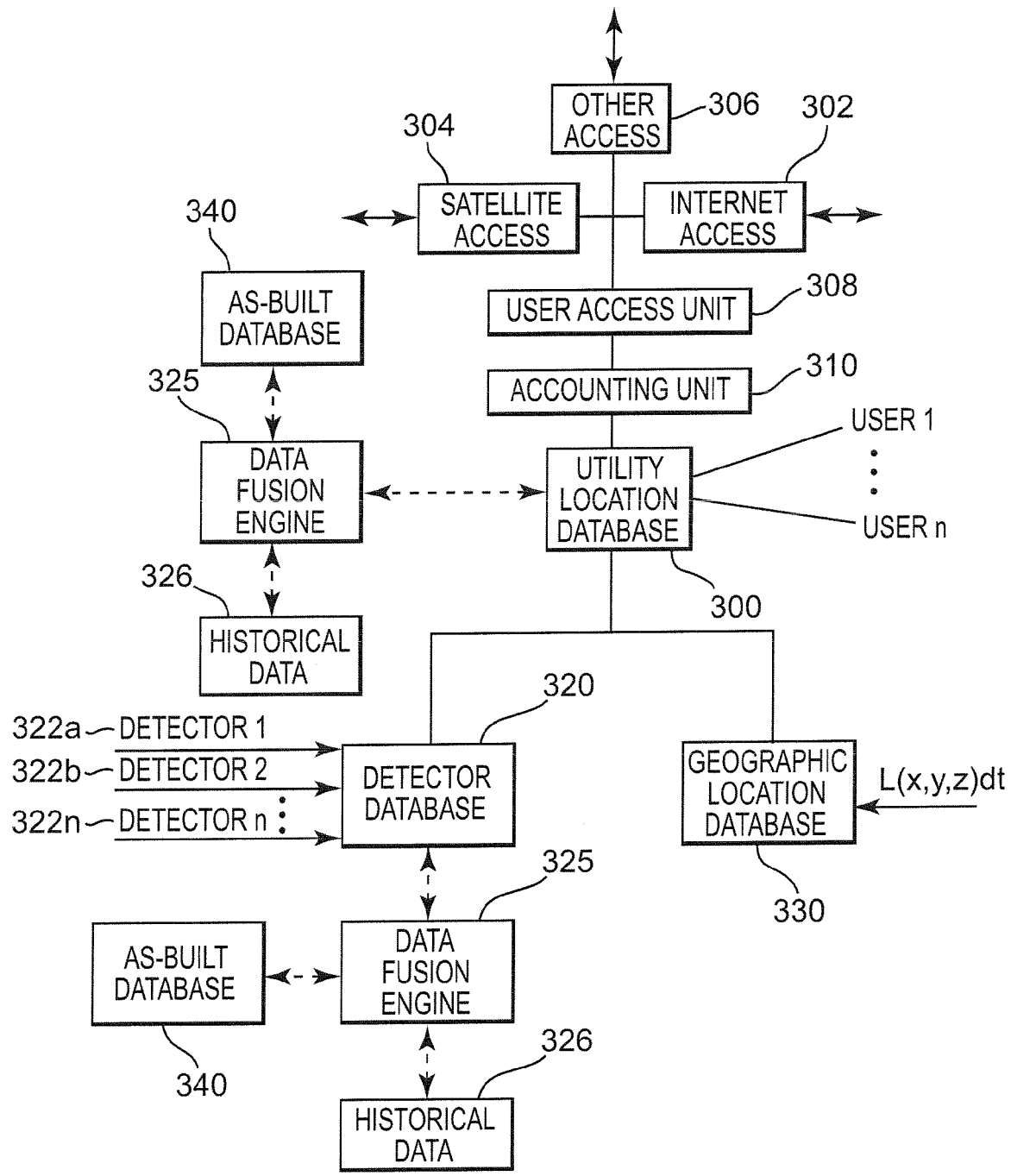
FIG. 12 illustrates a further embodiment of the present invention in which multiple public and/or private access paths are provided to and from a utility location database.

FIG. 12 illustrates a further embodiment of the present invention in which multiple public and/or private access paths are provided to and from the utility location database 300. According to this embodiment, a user may gain access to the utility location database 300 via a public network connection, such as an Internet connection 302, a web site, a satellite connection 304 or various other known communications mechanisms 306. Certain users, such as system administrators and technicians (e.g., user 1-user n in FIG. 12), may be provided with access rights that provide for access to the utility location database 300 that effectively bypasses the public access security measures of the system.

A user access unit 308 receives access requests from users and processes such requests to determine whether to grant access rights to a prospective user. Assuming the prospective user is determined to be an authorized user, the user access unit 308 allows the user to access the utility location database 300. If an unauthorized user is detected, the user access unit 308 communicates a warning message to the unauthorized user that access to the utility location database 300 is denied or significantly limited.

An accounting unit 310 provides a mechanism to charge users for access to and/or interaction with the utility location database 300 and any ancillary resources. A particular user may wish to interact with the utility location database 300 in different ways, each of which may have a different associated access or use cost. For example, a user may only wish to view the availability of utility mapping data and the quality of such data in a given area of a city. The user, in this case, may be charged a "view-only" access fee. Should the user later request a greater level of mapping detail for a particular street corner in the given area of the city, such as utility identification and size information for example, the greater quantity of detailed data may be priced at a rate higher than that of the less detailed city area data. By way of further example, and assuming the user wishes to obtain a copy of the more detailed street corner utility mapping data, the user may be charged at a higher rate for receiving a copy of the data as compared to view-only access to the data.

The accounting unit 310 may be programmed to include or otherwise interact with a rate schedule that indicates the cost of various levels of user access or resource usage with respect to various types of mapping data and services. The accounting unit 310 monitors user activity and accrual of charges so that users are billed appropriately.

A detector database 320 is shown coupled to the utility location database 300. A number of different detector inputs (e.g., detectors 1, 2, . . . n) are shown coupled to the detector database 320. A geographic location database 330 provides 2-D or preferably 3-D location data which is associated with the data acquired by the detectors 322a-n. Alternatively, each detector 322 may provide both detector and associated position data to the detector database 320. Associating geographic location information with the detector data provides for the locating of one or more utilities within a given volume of earth.

In the embodiment illustrated in FIG. 12, the detector database 320 stores raw data acquired by each of the detectors 322a-n. A data fusion engine 325 may be coupled to the detector database 320 which employs data fusion algorithms to process the multiple detector data sets received from the detectors 322a-n and stored in the detector database 320. The data fusion engine 325 may use one or more known techniques for processing the detector data, examples of which are disclosed in U.S. Pat. No. 5,321,613 to Porter, et al. and entitled Data Fusion Workstation, which is hereby incorporated herein in its entirety. It is understood that data fusion processing may be performed upon receiving the multiple detector output signals (e.g., in real-time), and that the results of such data fusion processing may be stored in the detector database 320.

The data fusion engine 325 may further interact with a historical database 326 which may store earlier-acquired data of varying types which may be useful in the processing the detector data. For example, the historical data may include known GPR or other detector profiles which are associated with known soil or utility types. Such historical data may be useful in improving the accuracy of the utility/object location determination and/or the quality or tolerance factor associated with the computed location data.

The data fusion engine 325 may also interact with an as-built database 340 which contains utility mapping data derived from earlier mapping operations or from manually derived mapping data acquired using conventional approaches. For example, conventionally obtained mapping data typically used by "one-call" services may be converted to electronic form and stored in the as-built database 340. The data fusion engine 325 may utilize as-built data to improve the accuracy of the resultant utility location data and/or the associated quality or tolerance data.

In another embodiment, as is also shown in FIG. 12, the data fusion engine 325, historical database 326, and as-built database 340 may be coupled to the utility location database 300. In this embodiment, raw or partially processed detector data is stored in the detector database 320 and transmitted to the utility location database 300. The utility location database 300, in this embodiment, may reside in a mainframe computer or several high-powered computers at a common location. For cost or processing efficiency reasons, it may be advantageous to perform data fusion operations on data stored in the utility location database 300, rather than in the detector database 320.

In a further embodiment, one or more neural networks may be employed to process various types of information acquired and/or produced by the system depicted in FIG. 12. For example, one or more neural networks may be employed to "learn" to process data stored in one or more of the historical database 326, as-built database 340, and previously fused data with similar data attributes in particular ways to produce various output data. Such a system is capable of improving that quality of output data over time as the system gains experience. For example, using previously acquired and processed data sets for which ground truth has been verified as training sets, the neural network can be taught to recognize similar situations in the future.

Training of the neural network(s) may be accomplished using several different approaches. In general, neural network adaptation typically takes place in accordance with a training regime in which the network is subjected to particular information environments on a particular schedule to achieve a desired end result. The neural network(s) may be embodied in hardware using known digital implementation techniques, such as those discussed in C. Alippi and M. Nigri, "Hardware Requirements for Digital VLSI Implementation of Neural Networks," IEEE International Joint Conference on Neural Networks, vol. 3, pp. 1873-1878, 1991 and M. Yasunaga et al., "Design, Fabrication and Evaluation of a 5-inch Wafer Scale Neural Network LSI Composed of 576 Digital Neurons," IEEE International Joint Conference on Neural Networks, vol. II, pp. 527-535, 1990.

Figure 13:
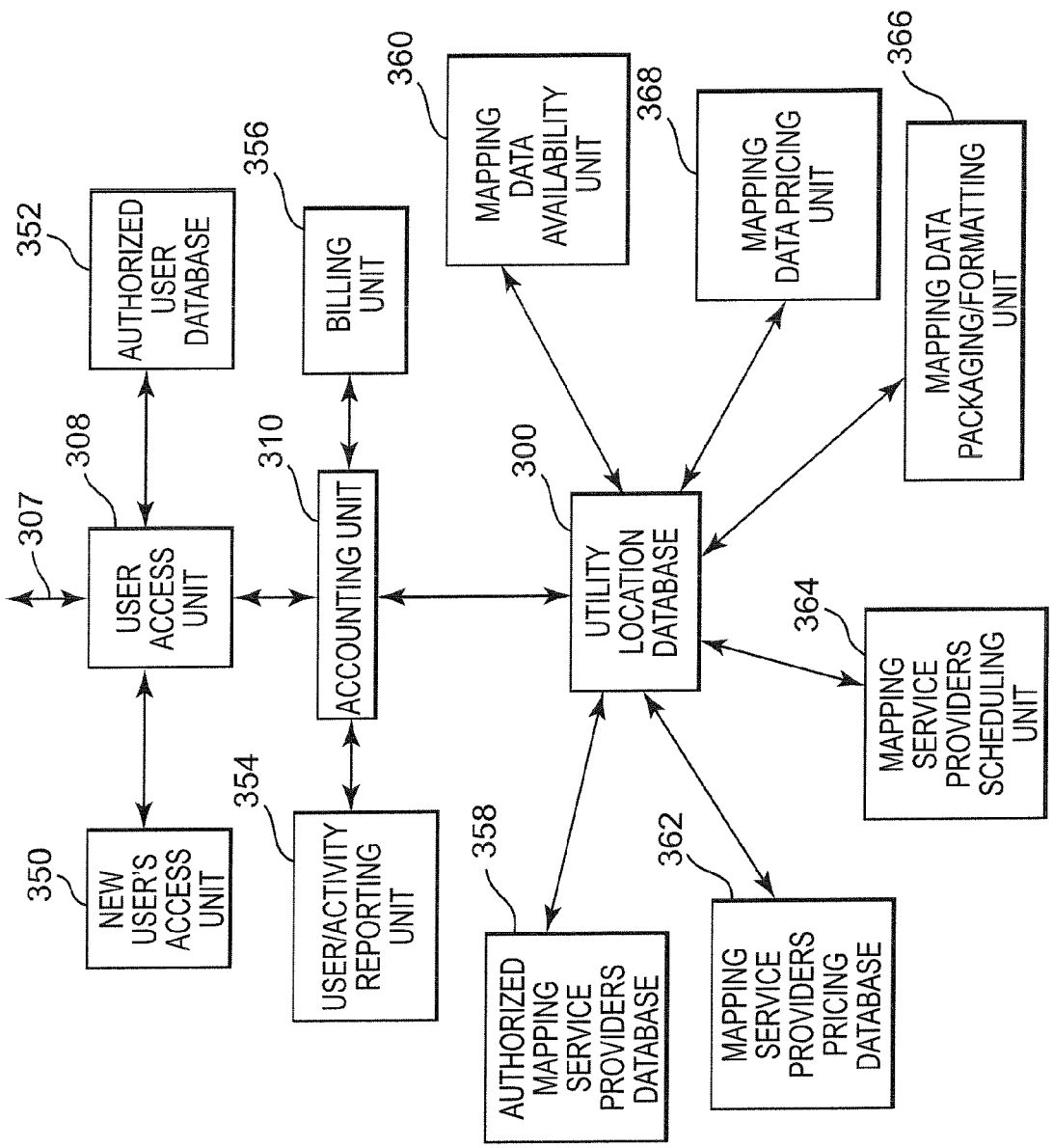
FIG. 13 illustrates various business related processing resources and interfaces that may enhance the ability to account and bill users for accessing and using a utility location database and ancillary resources according to an embodiment of the present invention.

FIG. 13 illustrates various business related processing resources and interfaces that may enhance the ability to account and bill users for accessing and using the utility location database 300 and ancillary resources. As is also shown in FIG. 12, FIG. 13 includes a user access unit 308 and an accounting unit 310 coupled between the utility location database 300 and an access node or interface to a public or private communication line 307 (e.g., internet or web connection). The user access unit 308 may interact with an authorized user database 352 which stores user information needed to distinguish between authorized and unauthorized users of the utility location database 300 resources. The authorized user database 352, for example, may store user names, user IDs, passwords, current address and contact information, and the like for each user having an account that permits access to the utility location database 300 resources.

A new user's access unit 350 provides for on-line registration of a new user to the system. The new user's access unit 350 allows a new user to establish an account which is then approved by the system and/or system administrator. When approved, the new user data is transmitted to the authorized user database 352, thus allowing subsequent access to the system by the new user using a standard access procedure established for authorized users.

The accounting unit 310 shown in FIG. 13 may incorporate or be coupled to a variety of accounting related data processing, storage, and interface resources. For example, a billing unit 356 may be coupled to the accounting unit 310 which provides a mechanism for generating electronic or printed billing invoices which are dispatched to users who utilize utility location database resources. In addition, the billing unit 356 may store information concerning a user's past payment data and may communicate a delinquency message to the user access unit 308 which, in turn, may limit or deny access to the system for a delinquent user.

A report generating facility 354 may also be coupled to the accounting unit 310 for generating a variety of accounting, financial, resource utilization, diagnostic, and other information associated with the operation and utilization of the utility location database 300 and ancillary resources. The reporting unit 354 may, for example, include a number of monitoring units that monitor a variety of system performance parameters, such as number of users accessing the system, number of bytes of data requested by users, types of data requested, uni-directional or bi-directional data transfer rates and bottlenecks in data flow, and the like.

A number of mapping service provider information resources may be accessible to users of the utility location database system. The term mapping service provider refers to an entity/person who is hired to perform a mapping operation of a given site. A user of the system may query an authorized mapping service provider database 358 to determine the identity of authorized mapping service providers or contractors that are available to perform a mapping operation in a given locale. Pricing information may be accessed using a mapping service providers pricing database 362. A scheduling unit 364 may be utilized by a user to schedule a particular mapping service provider to perform a desired mapping operation. The scheduling unit 364 may, for example, utilize scheduling algorithms used in on-line reservations systems by which real-time availability information is provided to users for a number of user selectable mapping service providers.

A number of mapping data access and processing facilities may be made available to users of the utility location database system. A mapping data availability unit 360, for example, may provide information concerning the present availability of mapping data for a user selectable region or location. For example, a user may wish to query whether utility mapping data is available for a given intersection in a particular city. Further, the user may want to know the relative quality or reliability of the data, such as whether the mapping data was obtained using a conventional manual approach or a high-tech approach consistent with the principles of the present invention. Other data, such as the mapping service provider or source (e.g., municipality) that provided the data, the age of the data, and the equipment used to obtain the data, may be made available to a user. The mapping data availability unit 360 provides users with this and other detailed information concerning the type of utility mapping data available for a specified area or location.

A mapping data pricing unit 368 allows users to obtain pricing information concerning the data and data processing resources made available by the system. For example, pricing information for "view-only" and downloadable data may be presented to a user. Volume discount information may also be made available to the user, such as information indicating discounts based on amount of data to be accessed or purchased by a user.

A mapping data packaging/formatting unit 366 may be utilized by the user to select a desired mode and format for receiving the purchased utility mapping data. For example, the user may select a given file format or protocol that best suits the user's needs. The data may be delivered to the purchasing user in a variety of forms, including on a CD-ROM or DVD, in a file form suitable for on-line transfer to a user designated destination (e.g., email address or web site) or digital storage media.

Figure 14:
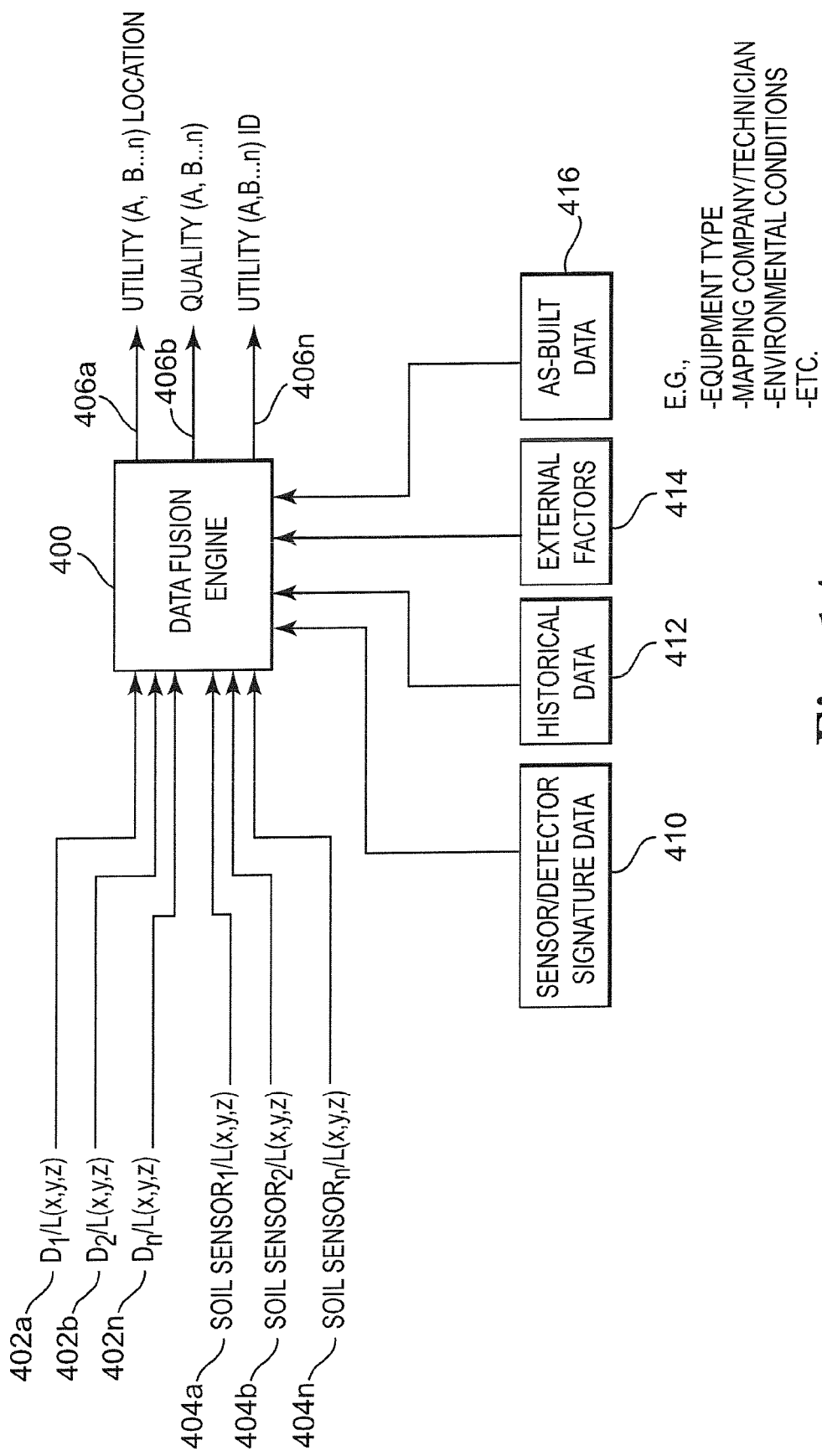
FIG. 14 illustrates an embodiment of a data fusion engine that processes a multiplicity of detector output signals to provide a utility location result for one or more utilities or structures passing through or contained within a volume of earth subject to a utility mapping operation.

FIG. 14 illustrates a data fusion engine 400 with a number of different inputs and several outputs. In one embodiment, the data fusion engine 400 receives detector output signals/data from a number of different utility location detectors 402a-n (e.g., D1, D2, ... Dn). As was discussed hereinabove, the data fusion engine 400 processes the multiplicity of detector output signals 402a-n to provide a utility location result 406a for one or more utilities or structures (24A, 24B, ... 24n) passing through or contained within the volume of earth subject to the utility mapping operation. A quality or tolerance factor 406b associated with the location computations is also preferably, but not necessarily, produced as an output from the data fusion engine 400. It is noted that the quality or tolerance factor data typically varies as a function of 3-dimensional location within the scanned volume of earth containing the one or more utilities. The data fusion engine 400 may further produce a utility ID output 406n which represents the engine's determination as to the identity of each utility subject to the mapping operation. The utility ID determination may be achieved in several ways, such as by use of utility tags (e.g., utility identification cooperative targets) or by object recognition algorithms which operate on the raw or fused detector output data.

In a further embodiment, the data fusion engine 400 receives an output signal produced by one or more soil characteristic sensors 404a-n (soil sensors 1, 2, ... n). The soil sensors 404 may provide an indication of one or more soil characteristics associated with the volume of earth subject to the mapping operation. The soil characteristics data produced by a soil sensor 404 preferably varies as a function of 3-D location within the scanned volume of earth. Alternatively, the soil sensor data may represent a surface or bulk characteristic of the subject region of earth. The soil sensor data may include resistivity, conductivity, permittivity (i.e., dielectric constant), temperature, water saturation, soil composition, soil hardness or other soil characteristic. These data may be input to the data fusion engine 400 which processes the data to enhance the accuracy of the resulting location, quality, and/or utility ID information produced at respective outputs of the data fusion engine 400.

Other data inputs to the data fusion engine 400 include sensor/detector signature data 410, historical or experience data 412, external factors information 414, and as-built data 416, for example. The sensor/detector signature data 410 may be representative or known sensor/detector signal outputs which are associated with known soils or structures. External factors 414 that may be useful to assess include the type of equipment used to perform the mapping operation, the ID of the mapping company or technician, environmental conditions such as ambient temperature, humidity, and pressure, and the like. The historical data 412 and as-built data 416 may be of a type described previously. In addition, the historical or experience data 412, 416 may include historical survey data and models of utilities.

Data fusion can take a number of forms, depending upon the data available and the intent of the user. For example, data fusion may consist only of co-location of the various data sets such as in a geographic information system (GIS). Data fusion preferably includes use of a GIS system as one component. Joint inversion of the sensor data may be performed, such that measurement parameters are translated into depth and location of target utilities and other features.

A utility mapping system capable of mapping ⅜ inch diameter non-metallic pipes 15 feet below the surface may be achieved by collecting as broad an array of different data types (e.g., seismic, EM, GPR, both time domain and frequency domain) as possible on a dense spatial grid. The return signal measured by each different instrument reflects different, but overlapping, aspects of the target utility and of the background medium in which it resides. An important aspect of the data analysis is to use the strengths of each individual technology to improve the resolution of the others by performing joint inversions on the fused data sets.

Data fusion is a viable approach if done intelligently. In general, the relationship between the different return signals is highly nonlinear, with, for example, the inversion of one data type serving to yield improved estimates for model parameters that are then used as input to the inversions of other data types (e.g., subsurface conductivity contrasts found from geoelectric section measurements using TDEM methods can be used to more accurately determine boundaries of seismic contrast, thus improving the seismic model to be inverted or vice versa). In performing these inversions, a Bayesian approach may be taken, in which the data plus any a priori probabilistic knowledge of the subsurface properties is used to seek optimal a postiori probabilities for the model parameters.

EM software based on EM scattering, for example, can be applied to the interaction between a GPR signal and the utility pipe. In this way, the usual classical ray-tracing algorithms for mapping reflecting bodies (that have trouble, for example, distinguishing between rocks and hollow non-metallic bodies of similar size and dielectric contrast) may be supplemented with "spectroscopic" data, i.e., resonant scattering data as a function of GPR frequency (obtained using a stepped-frequency GPR system), that may serve as a more detailed fingerprint for the shape and size of the object/utility. Long cylindrical pipes, for example, will have a highly characteristic scattering signature that may be accurately modeled and compared to data. Similar considerations apply to medium frequency seismic reflection data where the wavelength of the seismic wave is comparable to the pipe diameter.

Since non-metallic utilities are essentially invisible to standard low frequency EM or TDEM probes, such measurements are used to obtain the best possible characterization of the "background" medium. Seismic and/or GPR will respond to both the background and the utility of interest. This background may include metallic utilities and other "clutter" for which EM methods are designed to detect and map.

Inversions of the EM data are now used to obtain the best possible a priori parameters for input into the GPR or seismic model. In this way, the background may effectively be subtracted out to obtain enhanced sensitivity to the non-metallic utility of interest. It is noted that the GPR and seismic methods have fundamental intrinsic limitations of their own that may make the required detection difficult or impossible under certain circumstances. For example, due to signal attenuation (determined by the relation between soil conductivity and skin depth at the GPR frequency), the depth to which GPR is sensitive decreases with decreasing wavelength. In this situation, the shear wave seismic sensor becomes particularly important, as discussed previously.

Subsurface target identification may be facilitated by use of data fusion. Multiple target recognition algorithms may be utilized. Target utilities may have distinct signatures under ideal soil conditions. Utility trench characteristics may have distinct characteristics in layered or scattering soil conditions. Three-dimensional spatial coherence may be employed to enhance identification of target utilities with small target signatures relative to scattering or layering contrasts.

Ambiguity in target identification may be resolved using one or more of specific fusion of EM and GPR, target ID, and/or operator interface. The fusion of EM and GPR data sets may be implemented first, followed by inclusion of soil type, shear wave seismic, NMR, tomography, and other sensor data if needed or desired. Target ID is a tool that should not depend on specific geophysical measurements, and implements an extensible algorithm that incorporates multiple measurements and identification techniques. The operator interface displays incoming data, target ID results, DGPS or other positional reference data, allows configuration of acquisition parameters, maintains site/project information, captures operator comments, and other information to be developed.

Fusion of EM and GPR is preferably premised on radar and EM forward modeling from a common electrical property structure. The modeling software provides for deriving electrical property structure from an expected physical soil structure. Soil type, grain size, salinity, and saturation through petrophysical equations can be accounted for. A library of target utility characteristics is preferably compiled. Joint inversion of the EM/GPR data is performed to translate measurement parameters into target utility depth and location data. The interactions of target and soil types provides for employment of several identification methods to distinguish targets for display in an operator interface, which includes a display, such as display 43 depicted in FIG. 2.

Three of such identification methods include direct detection of an expected target in homogeneous anisotropic or layered medium, layer disruption with trenching or pull-up, and change in scattering characteristics of target or trench versus undisturbed soil. The operator interface preferably makes as many decisions for the operator as possible on as many systems as possible. In one embodiment, the operator is provided with a simple data set-up screen and real-time display of the data being collected. A field screen preferably presents as much real-time processed data as is possible for the system being used. Raw, partially processed, and/or fused data is preferably selectively presentable to the operator via the operator interface.

One or more databases of sensor signatures for various situations are preferably developed and maintained. The sensor signature data is preferably used for the data fusion processes. Data fusion processes may be extended to provide for automatic material recognition, automatic object size recognition, and automatic object type recognition, and further provide for automatically drawing cylinders representative of detected pipes and other utilities.

Figure 15:
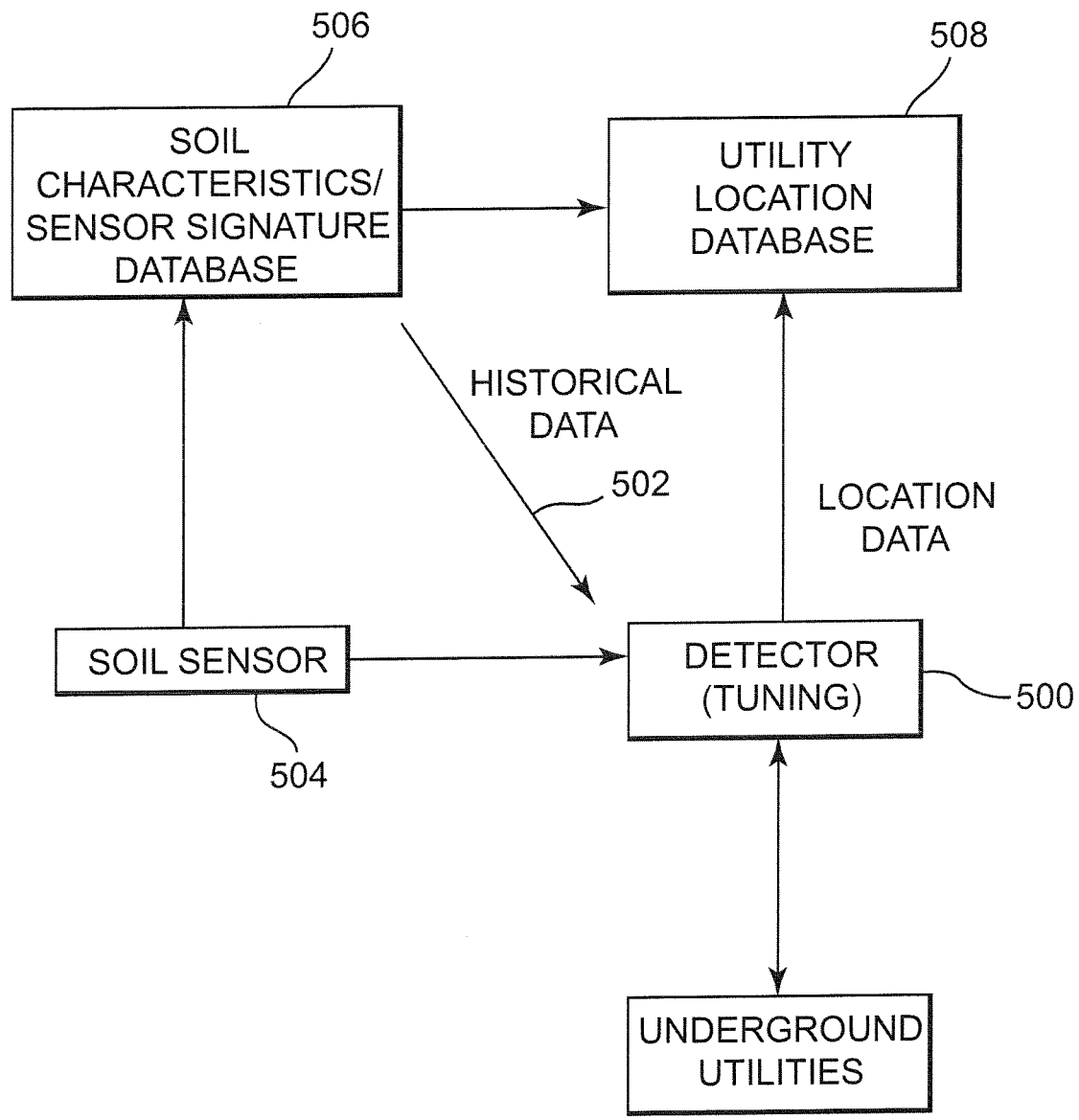
FIG. 15 provides an illustration showing how a particular utility detector may be tuned or calibrated using soil sensor data in accordance with an embodiment of the present invention.

FIG. 15 provides an illustration showing how a particular detector 500 may be tuned or calibrated using soil sensor data. In one approach, a detector 500 may be calibrated using an initial set of historical soil characteristics data 502, which may comprise sensor signature data. After initially tuning the detector 500, a soil sensor 504 may provide soil characteristics data to the detector 500 developed from the native soil in the locale to be subjected to mapping. The detector 500 may then be further tuned using this locally obtained soil characteristics data.

In addition or in the alternative, the soil sensor data may be communicated or otherwise collected by a soil characteristics/sensor signature database 506. This soil characteristics data by used for a variety of purposes, such as for refining a given detector/sensor signature data set and for shared use by a user encountering similar soil in another location (e.g., other part of the country or other continent). The soil sensor data may be communicated to or otherwise accessed by the utility location database 508.

Figure 16:
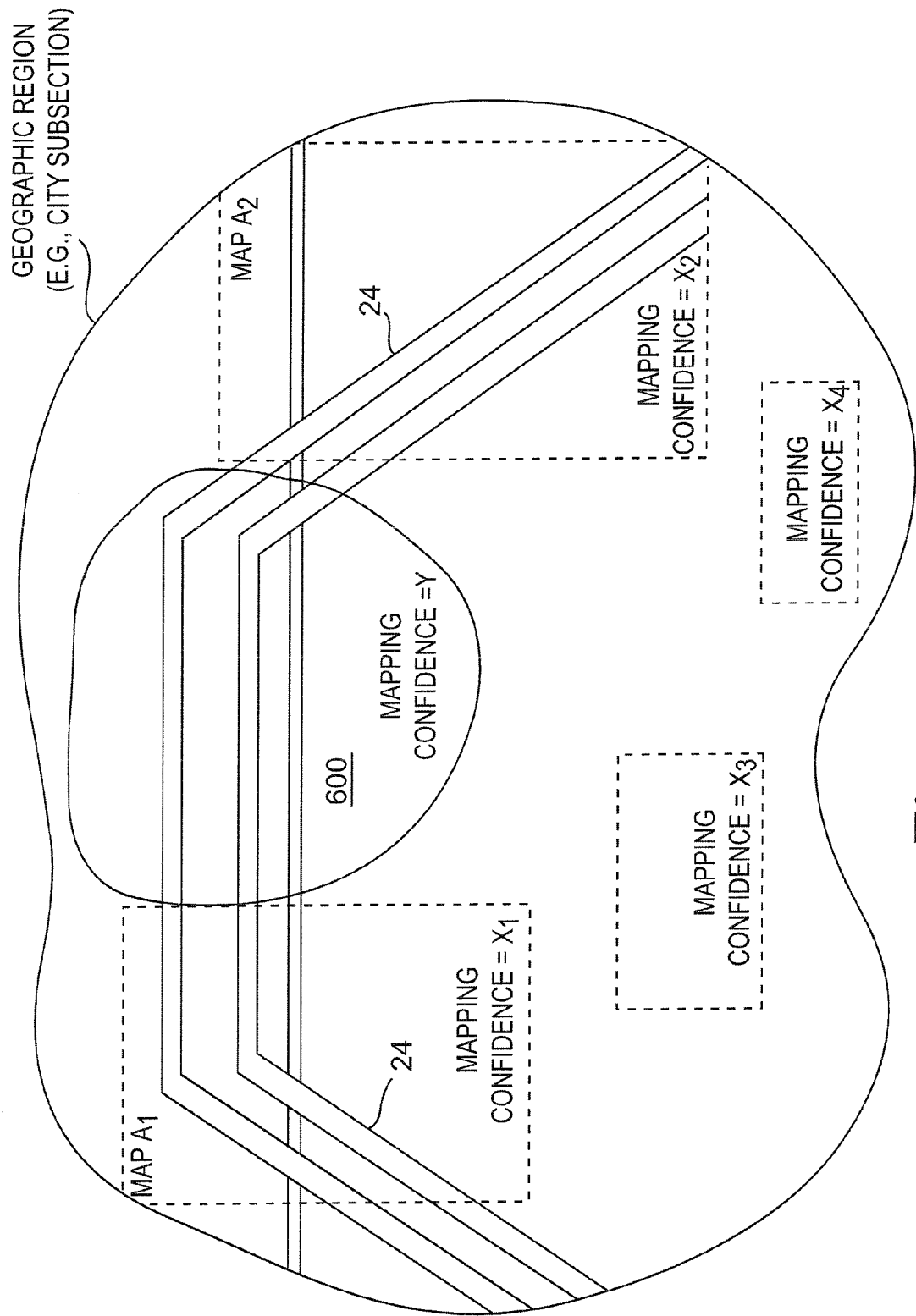
FIG. 16 shows a section of a city or other area through which one or more utilities pass, the city section including regions in which the level of confidence in utility mapping data varies.

FIG. 16 shows a section of a city or other area through which one or more utilities 24 pass. The city section includes regions in which the level of confidence in the utility mapping data varies. The term confidence level in this context refers to the level of confidence a service company or technician would likely place on the utility mapping data available for a particular location or area when needing to rely on the mapping data, such as for purposes of excavating near a utility or gaining access to a buried utility. For example, the mapped regions identified as MAP A1 and MAP A2 have associated confidence levels X1 and X2, respectively. Other mapped regions are shown to have confidence levels X3 and X4. The confidence levels having an "X" prefix indicate that the utility mapping data for the region was obtained using a high-tech mapping approach consistent with the principles of the present invention. The confidence levels X1, X2, X3, and X4 represent different levels of confidence in the high-tech mapping data resulting from a number of factors, including type of equipment used and mapping service provider hired to perform the mapping operation (e.g., authorized versus unaffiliated mapping service provider).

One particular region 600 is indicated as having a mapping confidence level of Y. In this illustrative example, it is assumed that high-tech mapping of the city section shown in FIG. 16 has occurred in a patchwork manner, which is likely to be the case in many locales. The region 600 having a confidence level of Y is a region in which no high-tech mapping has been performed. Rather than have a void in the mapping data between MAPs A1 and A2, it may be desirable to obtain the best available mapping data and store this data in the utility location database. In this manner, large areas of a city or region may have associated utility mapping data made available to users of the utility location database system, notwithstanding the disparate mapping data confidence levels. As high-tech mapping expands within a given area having mixed confidence level mapping data, the lower confidence data may be replaced by higher confidence mapping data.

Figure 17:
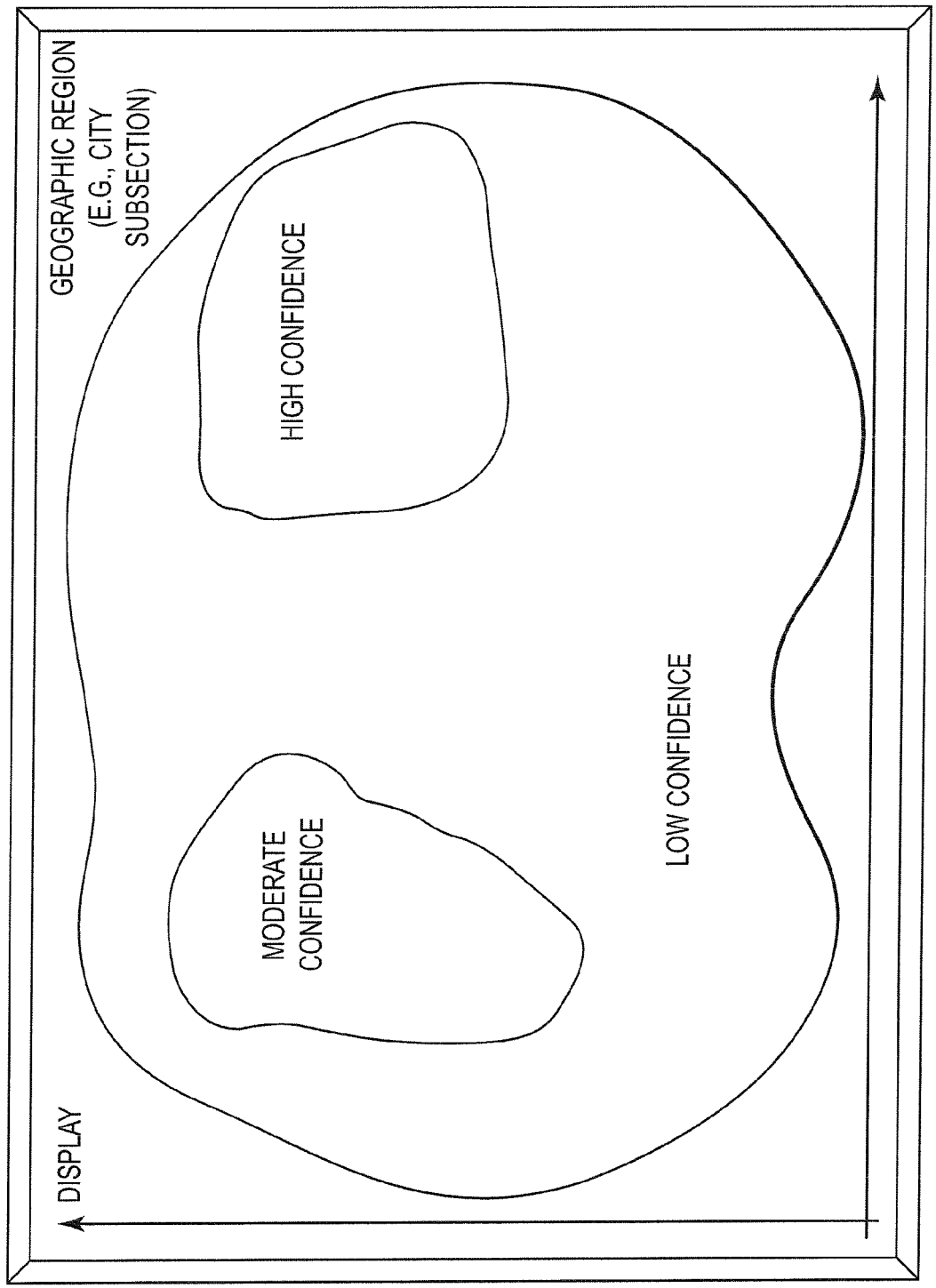
FIG. 17 is a depiction of a user interface display in which a region of interest is presented and a snapshot view of a selected region indicates the existence of mapping data for the region having mixed confidence levels according to an embodiment of the present invention.

FIG. 17 is a depiction of a user interface display in which a region of interest is presented to a user. For example, the region of interest may be a city subsection. A snapshot view of the selected region indicates the existence of mapping data for the region having mixed confidence levels. For example, the region shown in FIG. 17 indicates a high confidence region, and moderate confidence region, and a low confidence region. If, for example, a user is required to excavate near sensitive utilities in a low or moderate confidence region, the user will likely need to contract to have a high-tech mapping operation be performed in the region, so as to replace the mapping data of questionable confidence with high confidence data. If the user is required to excavate near the sensitive utilities in a high confidence region, the user will likely not need to have a subsequent high-tech mapping operation be performed in this region.

It will, of course, be understood that various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. An apparatus, comprising:
a plurality of disparate sensors configured for above-ground travel within a survey region and to evaluate a volume of earth of a subsurface;
at least a first sensor of the plurality of disparate sensors configured to generate a first probe signal at a first frequency or first range of frequencies and to receive a first return signal from the subsurface in response to the first probe signal;
at least a second sensor of the plurality of disparate sensors configured to generate a second probe signal at a second frequency or second range of frequencies and to receive a second return signal from the subsurface in response to the second probe signal;
a positioning system configured to produce position data associated with a geographic position of each of the sensors;
memory for storing the position data and sensor data associated with at least the first and second return signals;
a soil sensor configured to measure a soil parameter within the volume of earth that influences a measurement of subsurface depth; and
a processor coupled to the sensors, positioning system, and memory, the processor configured to detect underground utilities within the volume of earth using the sensor data, associate the sensor data with the position data for each of the detected underground utilities, determine a depth of each of the detected underground utilities using the sensor data and soil sensor data; and store the associated sensor, position, and depth data for each of the detected underground utilities in the memory.

2. The apparatus of claim 1, wherein the processor is configured to:
calculate the depth of each of the detected underground utilities using the sensor data; and
adjust the calculated depth of at least some of the detected underground utilities using the soil sensor data.

3. The apparatus of claim 1, wherein the processor is configured to:
receive ground truth data for at least some of the detected underground utilities; and
adjust the depth data for the at least some of the detected underground utilities using the received ground truth data.

4. The apparatus of claim 1, wherein the processor is configured to compute a depth tolerance factor associated with the depth data for at least one of the detected underground utilities.

5. The apparatus of claim 1, wherein the soil sensor is configured to measure a soil parameter that influences a speed of sensor signal propagation through the subsurface.

6. The apparatus of claim 1, wherein the soil sensor comprises a permittivity sensor.

7. The apparatus of claim 1, wherein the soil sensor comprises a conductivity sensor or a resistivity sensor.

8. The apparatus of claim 1, wherein the soil sensor comprises a temperature sensor.

9. The apparatus of claim 1, wherein the soil sensor comprises one or more of a water saturation sensor, a composition sensor, and a hardness sensor.

10. The apparatus of claim 1, wherein the soil sensor comprises a cone penetrometer.

11. The apparatus of claim 1, wherein the first and second probe signals have about the same wavelength upon reaching a subsurface object subject to evaluation by the sensors.

12. The apparatus of claim 1, wherein the soil sensor data varies as a function of three dimensional location within the volume of earth.

13. An apparatus, comprising:
a plurality of disparate sensors configured for above-ground travel within a survey region, each of the sensors configured to communicate a probe signal into the subsurface;
a positioning system configured to produce position data associated with a position of each of the sensors;
a soil sensor configured to measure a soil parameter within a volume of earth that influences measurement of subsurface depth at the survey region;
memory configured for storing position data and sensor data associated with each of the sensors; and
a processor coupled to the sensors, positioning system, and memory, the processor configured to detect underground utilities within the volume of earth, determine a position and a depth of each of the detected underground utilities, and store data for each of the detected underground utilities in the memory.

14. The apparatus of claim 13, wherein the processor is configured to:
calculate the depth of each of the detected underground utilities using the sensor data; and
adjust the calculated depth of at least some of the detected underground utilities using data produced by the soil sensor.

15. The apparatus of claim 14, wherein the processor is configured to:
receive ground truth data for at least some of the detected underground utilities; and
adjust the depth data for the at least some of the detected underground utilities using the received ground truth data.

16. The apparatus of claim 14, wherein the processor is configured to compute a depth tolerance factor associated with depth data for at least one of the detected underground utilities.

17. The apparatus of claim 14, wherein the soil sensor is configured to measure a soil parameter that influences a speed of sensor signal propagation through the subsurface.

18. The apparatus of claim 14, wherein the soil sensor comprises one or more of a permittivity sensor, a conductivity sensor, and a resistivity sensor.

19. The apparatus of claim 14, wherein:
the soil sensor comprises a plurality of soil sensing devices;
at least one of the plurality of disparate sensors comprises a ground penetrating radar, and at least one of the plurality of soil sensing devices comprises a sensing device configured to measure a soil parameter that influences measurement of subsurface depth by the ground penetrating radar; and
at least one of the plurality of disparate sensors comprises an electromagnetic sensor, and at least one of the plurality of soil sensing devices comprises a sensing device configured to measure a soil parameter that influences measurement of subsurface depth by the electromagnetic sensor.

20. The apparatus of claim 14, wherein probe signals produced by the disparate sensors have about the same wavelength upon reaching a subsurface object subject to evaluation by the sensors.

21. A processor-implemented method, comprising:
directing probe signals into a subsurface from each of a plurality of at- or above-ground locations defining a survey region;

producing position data at each of the at- or above-ground locations;
measuring a soil parameter within a volume of earth that influences measurement of subsurface depth for the survey region;
detecting underground utilities within the volume of earth of the subsurface for the survey region;
associating position and depth data for each of the detected underground utilities using a processor; and
storing underground utility detection data in a memory.

* * * * *